US009275658B2

(12) United States Patent
Sasaki et al.

(10) Patent No.: US 9,275,658 B2
(45) Date of Patent: Mar. 1, 2016

(54) THERMALLY-ASSISTED MAGNETIC RECORDING HEAD INCLUDING A PLASMON GENERATOR

(71) Applicants: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Hironori Araki, Milpitas, CA (US); Ryuji Fujii, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Hironori Araki, Milpitas, CA (US); Ryuji Fujii, Hong Kong (CN)

(73) Assignees: HEADWAY TECHNOLOGIES, INC., Milpitas, CA (US); SAE MAGNETICS (H.K.) LTD., Hong Kong (HK)

( * ) Notice: Subject to any disclaimer, the term of this patent is extended or adjusted under 35 U.S.C. 154(b) by 28 days.

(21) Appl. No.: 14/209,262

(22) Filed: Mar. 13, 2014

(65) Prior Publication Data
US 2015/0262593 A1 Sep. 17, 2015

(51) Int. Cl.
G11B 5/00 (2006.01)
G11B 5/31 (2006.01)
G11B 5/48 (2006.01)
G11B 5/127 (2006.01)
G11B 5/60 (2006.01)

(52) U.S. Cl.
CPC ............. G11B 5/314 (2013.01); G11B 5/1278 (2013.01); G11B 5/4866 (2013.01); G11B 5/607 (2013.01); G11B 5/6076 (2013.01); G11B 5/6088 (2013.01); G11B 2005/0021 (2013.01)

(58) Field of Classification Search
None
See application file for complete search history.

(56) References Cited

U.S. PATENT DOCUMENTS

| | | | |
|---|---|---|---|
| 8,456,968 B1 | 6/2013 | Sasaki et al. |
| 8,462,594 B1 | 6/2013 | Aoki et al. |
| 8,482,879 B1 | 7/2013 | Sasaki et al. |
| 8,493,821 B1 | 7/2013 | Sasaki et al. |
| 8,498,183 B1 | 7/2013 | Sasaki et al. |
| 8,564,905 B1 | 10/2013 | Umehara et al. |
| 8,588,040 B1 | 11/2013 | Fujita et al. |
| 8,614,932 B1 | 12/2013 | Sasaki et al. |
| 8,691,102 B1 | 4/2014 | Araki et al. |
| 8,711,663 B1 | 4/2014 | Sasaki et al. |
| 8,760,809 B1 | 6/2014 | Sasaki et al. |
| 8,923,100 B1 | 12/2014 | Wessel et al. |
| 2007/0096854 A1 | 5/2007 | Matsumoto et al. |
| 2009/0168220 A1 | 7/2009 | Komura et al. |
| 2010/0103553 A1 | 4/2010 | Shimazawa et al. |
| 2010/0142079 A1 | 6/2010 | Tanaka et al. |

(Continued)

OTHER PUBLICATIONS

Office Action issued in U.S. Appl. No. 14/021,365 dated Jul. 2, 2014.

(Continued)

Primary Examiner — Brian Butcher
(74) Attorney, Agent, or Firm — Oliff PLC

(57) ABSTRACT

A return path section includes first and second yoke portions and first, second and third columnar portions. The first and second yoke portions and the first columnar portion are located on the front side in the direction of travel of a recording medium relative to a waveguide core. The second and third columnar portions are located on opposite sides of a plasmon generator and connected to a shield. The first yoke portion connects a main pole to the first columnar portion. The second yoke portion connects the first columnar portion to the second and third columnar portions. A coil is wound around the first columnar portion. A heater and an expansion layer are located on the rear side in the direction of travel of the recording medium relative to the core.

7 Claims, 11 Drawing Sheets

(56) References Cited

U.S. PATENT DOCUMENTS

| | | |
|---|---|---|
| 2010/0165802 A1 | 7/2010 | Stipe |
| 2010/0302672 A1 | 12/2010 | Aoki et al. |
| 2010/0315736 A1 | 12/2010 | Takayama et al. |
| 2011/0002199 A1 | 1/2011 | Takayama et al. |
| 2011/0038236 A1 | 2/2011 | Mizuno et al. |
| 2011/0058272 A1 | 3/2011 | Miyauchi et al. |
| 2011/0090587 A1 | 4/2011 | Chou et al. |
| 2011/0116349 A1 | 5/2011 | Komura et al. |
| 2011/0170381 A1 | 7/2011 | Matsumoto |
| 2011/0176398 A1 | 7/2011 | Tanaka et al. |
| 2011/0222184 A1 | 9/2011 | Komura et al. |
| 2011/0222190 A1 | 9/2011 | Hara et al. |
| 2011/0242697 A1 | 10/2011 | Mori et al. |
| 2011/0292772 A1 | 12/2011 | Chou et al. |
| 2012/0275280 A1 | 11/2012 | Miyauchi et al. |
| 2012/0292287 A1 | 11/2012 | Araki et al. |
| 2012/0314323 A1 | 12/2012 | Sasaki et al. |
| 2013/0038966 A1* | 2/2013 | Sasaki et al. .......... 360/123.04 |
| 2013/0215725 A1 | 8/2013 | Hirata et al. |
| 2013/0294208 A1 | 11/2013 | Peng et al. |
| 2014/0241139 A1 | 8/2014 | Nishijima et al. |
| 2015/0043316 A1 | 2/2015 | Rea et al. |

OTHER PUBLICATIONS

U.S. Appl. No. 14/335,528 in the name of Yoshitaka Sasaki et al filed Jul. 18, 2014.
U.S. Appl. No. 14/475,090 in the name of Yoshitaka Sasaki et al.
U.S. Appl. No. 14/209,262 in the name of Yoshitaka Sasaki et al filed Mar. 13, 2014.
Nov. 19, 2014 Office Action issued in U.S. Appl. No. 14/021,365.
U.S. Appl. No. 14/021,365, filed Sep. 9, 2013 to Sasaki et al.
Sep. 21, 2015 Notice of Allowance issued in U.S. Appl. No. 14/335,528.
Oct. 5, 2015 Notice of Allowance issued in U.S. Appl. No. 14/475,090.

* cited by examiner

THERMALLY-ASSISTED MAGNETIC RECORDING HEAD INCLUDING A PLASMON GENERATOR

BACKGROUND OF THE INVENTION

1. Field of the Invention

The present invention relates to a thermally-assisted magnetic recording head for use in thermally-assisted magnetic recording in which a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider that flies slightly above the surface of a recording medium. The slider has a medium facing surface facing the recording medium. The medium facing surface has an air inflow end (a leading end) and an air outflow end (a trailing end).

Here, the side of the positions closer to the leading end relative to a reference position will be defined as the leading side, and the side of the positions closer to the trailing end relative to the reference position will be defined as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication No. 2011/0058272 A1 discloses a technology in which the surface of the core of the waveguide and the surface of the plasmon generator are arranged to face each other with a gap therebetween, so that evanescent light that occurs from the surface of the core based on the light propagating through the core is used to excite surface plasmons on the plasmon generator to generate near-field light based on the excited surface plasmons.

A thermally-assisted magnetic recording head that employs a plasmon generator as a source of generation of near-field light is configured so that the write head unit includes a coil, a main pole, and the plasmon generator. The coil produces a magnetic field corresponding to data to be written on a recording medium. The main pole has an end face located in the medium facing surface. The main pole allows a magnetic flux corresponding to the magnetic field produced by the coil to pass, and produces a write magnetic field from the aforementioned end face. The plasmon generator includes a near-field light generating part located in the medium facing surface. For the thermally-assisted magnetic recording head, it is demanded that the end face of the main pole and the near-field light generating part of the plasmon generator be located in close proximity to each other.

To increase the linear recording density of a magnetic recording device, it is effective to use a perpendicular magnetic recording system in which the direction of magnetization of signals to be written on tracks of a recording medium is perpendicular to the plane of the recording medium. It is also effective to increase, on the tracks, the gradient of the change in write magnetic field intensity with respect to the change in position along the direction in which the tracks extend, i.e., the direction along the tracks (this gradient will hereinafter be referred to as the write field intensity gradient). These also apply to a magnetic recording device that employs thermally-assisted magnetic recording.

In order to increase the write field intensity gradient in a magnetic head of the perpendicular magnetic recording system, it is effective to provide a shield that has an end face located in the medium facing surface at a position near the end face of the main pole. U.S. Patent Application Publication No. 2011/0058272 A1 discloses a technology for increasing the write field intensity gradient by providing a bottom shield on the leading side of the main pole, the bottom shield having an end face located in the medium facing surface.

A magnetic head including a shield is typically provided with a return path section for connecting the shield to a portion of the main pole located away from the medium facing surface. One or more spaces are defined between the return path section and the main pole. The coil is provided to pass through the one or more spaces.

Now, consider a thermally-assisted magnetic recording head configured so that the near-field light generating part of the plasmon generator is interposed between the end face of the main pole and the end face of the shield, and the core of the waveguide and the return path section intersect each other without contacting each other. A general approach to precluding the contact between the core and the return path section is to branch a portion of the return path section that intersects the core into two portions so as to detour around the core and then merge the two portions into one, as disclosed in U.S. Patent Application Publication No. 2011/0058272 A1. When this approach is employed, the return path section is formed to include a coupling portion for coupling the two branched portions. The coil is wound around the coupling portion, for example.

In the above-described configuration, the width of the coupling portion in the track width direction is equal to or greater than the distance between the respective outer ends of the two branched portions in the track width direction, thus being comparatively great. The coil should be long in entire length if wound around the coupling portion. In this case, the coil has a high resistance, and consequently a high heating value. This gives rise to a problem that components around the coil expand and as a result, part of the medium facing surface protrudes toward the recording medium and may readily collide with the recording medium. In order to prevent this, the distance between the medium facing surface and the recording medium could be increased. However, this would disadvantageously lead to deterioration in write characteristics such as the overwrite property or to an increase in error rate.

On the other hand, in order to improve the write characteristics in a high frequency band, it is desirable that the main pole, the shield and the return path section should form a magnetic path of reduced length. To achieve this, it is effective to bring the portion of the return path section intersecting the core into closer proximity to the medium facing surface. Here, assume that the coil is wound around the coupling portion of the return path section. In this case, since the coupling portion is comparatively great in width in the track width direction as mentioned above, the coil should include one or more conductor portions located between the coupling portion and the medium facing surface and extending linearly in parallel to the medium facing surface (such one or more conductor portions will hereinafter be referred to as linear conductor portion(s)). Bringing the portion of the return path section intersecting the core into closer proximity to the medium facing surface causes the linear conductor portion(s) to be narrow and long. This in turn causes the coil to be higher in resistance, so that the above-described various problems will become more noticeable. Accordingly, in this case, it is difficult to reduce the length of the magnetic path formed by the main pole, the shield and the return path section.

Further, a thermally-assisted magnetic recording head has the following problems. Part of the energy of light guided to the plasmon generator through the waveguide is transformed into heat in the plasmon generator. Part of the energy of near-field light generated by the plasmon generator is also transformed into heat in the plasmon generator. Thus, during the operation of the thermally-assisted magnetic recording head, the plasmon generator rises in temperature and expands to protrude significantly toward the recording medium. As a result, in the thermally-assisted magnetic recording head, a protective film covering the medium facing surface may be broken at a portion near the plasmon generator by contact with the recording medium. If the portion of the protective film near the plasmon generator is broken, the plasmon generator may be damaged by contact with the recording medium or may be corroded by contact with high temperature air.

OBJECT AND SUMMARY OF THE INVENTION

It is an object of the present invention to provide a thermally-assisted magnetic recording head in which a near-field light generating part of a plasmon generator is located between an end face of a main pole and an end face of a shield in the medium facing surface, the thermally-assisted magnetic recording head exhibiting excellent write characteristics in a high frequency band and being capable of protecting the plasmon generator.

A thermally-assisted magnetic recording head of the present invention includes: a medium facing surface facing a recording medium; a coil producing a magnetic field that corresponds to data to be written on the recording medium; a main pole; a shield formed of a magnetic material; a return path section formed of a magnetic material; a waveguide; and a plasmon generator. The thermally-assisted magnetic recording head of the present invention further includes: a heater configured to generate heat for causing the medium facing surface to protrude in part; an expansion layer configured to expand under the heat generated by the heater to thereby cause the medium facing surface to protrude in part; and a nonmagnetic portion formed of a nonmagnetic material and surrounding the expansion layer.

The main pole has a first end face located in the medium facing surface. The main pole allows a magnetic flux corresponding to the magnetic field produced by the coil to pass, and produces a write magnetic field for writing data on the recording medium by means of a perpendicular magnetic recording system. The shield has a second end face located in the medium facing surface. The return path section connects the main pole and the shield to each other, and allows a magnetic flux corresponding to the magnetic field produced by the coil to pass. The waveguide includes a core through which light propagates, and a cladding provided around the core. The plasmon generator includes a near-field light generating part located in the medium facing surface.

The second end face is located on the rear side in the direction of travel of the recording medium relative to the first end face. The near-field light generating part is located between the first end face and the second end face. The plasmon generator is configured so that a surface plasmon is excited on the plasmon generator based on the light propagating through the core, and the near-field light generating part generates near-field light based on the surface plasmon.

The return path section includes a first yoke portion, a second yoke portion, a first columnar portion, a second columnar portion, and a third columnar portion. The first yoke portion, the second yoke portion and the first columnar portion are located on the front side in the direction of travel of the recording medium relative to the core. The first columnar portion is located away from the medium facing surface and has a first end and a second end opposite to each other in the direction of travel of the recording medium. The second and third columnar portions are located closer to the medium facing surface than is the first columnar portion. The first yoke portion connects the main pole to the first end of the first columnar portion. The second columnar portion and the third columnar portion are located on opposite sides of the plasmon generator in the track width direction and connected to the shield. The second yoke portion is connected to the second end of the first columnar portion, and connected to the shield via the second and third columnar portions. The coil is wound around the first columnar portion.

The heater, the expansion layer and the nonmagnetic portion are located on the rear side in the direction of travel of the recording medium relative to the core. The expansion layer is higher in thermal conductivity and linear thermal expansion coefficient than the nonmagnetic portion.

In the thermally-assisted magnetic recording head of the present invention, the core may have an evanescent light generating surface that generates evanescent light based on the light propagating through the core, and the plasmon generator may include a plasmon exciting part located at a predetermined distance from the evanescent light generating surface and facing the evanescent light generating surface. In this case, in the plasmon generator, a surface plasmon is excited on the plasmon exciting part through coupling with the evanescent light generated by the evanescent light generating surface, the surface plasmon propagates to the near-field light generating part, and the near-field light generating part generates near-field light based on the surface plasmon.

The thermally-assisted magnetic recording head of the present invention may further include a sensor for detecting contact of part of the medium facing surface with the recording medium.

In the thermally-assisted magnetic recording head of the present invention, the core may have a front end face facing toward the medium facing surface. In this case, the front end face may be located between the first end face and the second end face in the direction of travel of the recording medium.

Where the core has the front end face facing toward the medium facing surface, the front end face may have a first edge and a second edge opposite to each other in the direction of travel of the recording medium. The first edge is located closer to the near-field light generating part than is the second edge. When the front end face is divided into two regions: a first region extending from the midpoint position between the first edge and the second edge to the first edge; and a second region extending from the midpoint position to the second edge, the shield may overlap only the first region of the front end face when viewed in a direction perpendicular to the medium facing surface.

Where the shield overlaps only the first region of the front end face when viewed in the direction perpendicular to the medium facing surface and the second and third columnar portions are connected to the shield, the shield may include a first non-overlapping portion and a second non-overlapping portion that are located on opposite sides of the front end face of the core in the track width direction when viewed in the direction perpendicular to the medium facing surface. In this case, the second columnar portion is connected to the first non-overlapping portion, and the third columnar portion is connected to the second non-overlapping portion.

Where the shield overlaps only the first region of the front end face when viewed in the direction perpendicular to the medium facing surface and the second and third columnar portions are connected to the shield, the first end face and the second end face may be at a distance of 50 to 300 nm from each other.

In the thermally-assisted magnetic recording head of the present invention, the first yoke portion, the second yoke portion and the first columnar portion are located on the front side in the direction of travel of the recording medium relative to the core, and the coil is wound around the first columnar portion. These features of the present invention make it possible to reduce the length of the magnetic path formed by the main pole, the shield and the return path section, while preventing an increase in resistance of the coil.

Further, in the thermally-assisted magnetic recording head of the present invention, the heater and the expansion layer are located on the rear side in the direction of travel of the recording medium relative to the core. This feature of the present invention makes it possible that a portion of the medium facing surface to be protruded by the expansion layer is located closer to the recording medium than is the near-field light generating part of the plasmon generator, thus allowing for protection of the plasmon generator.

Consequently, the present invention is able to provide a thermally-assisted magnetic recording head in which the near-field light generating part of the plasmon generator is located between the end face of the main pole and the end face of the shield in the medium facing surface, the thermally-assisted magnetic recording head exhibiting excellent write characteristics in a high frequency band and being capable of protecting the plasmon generator.

Other and further objects, features and advantages of the present invention will appear more fully from the following description.

DETAILED DESCRIPTION OF THE PREFERRED EMBODIMENTS

First Embodiment

Figure 1:
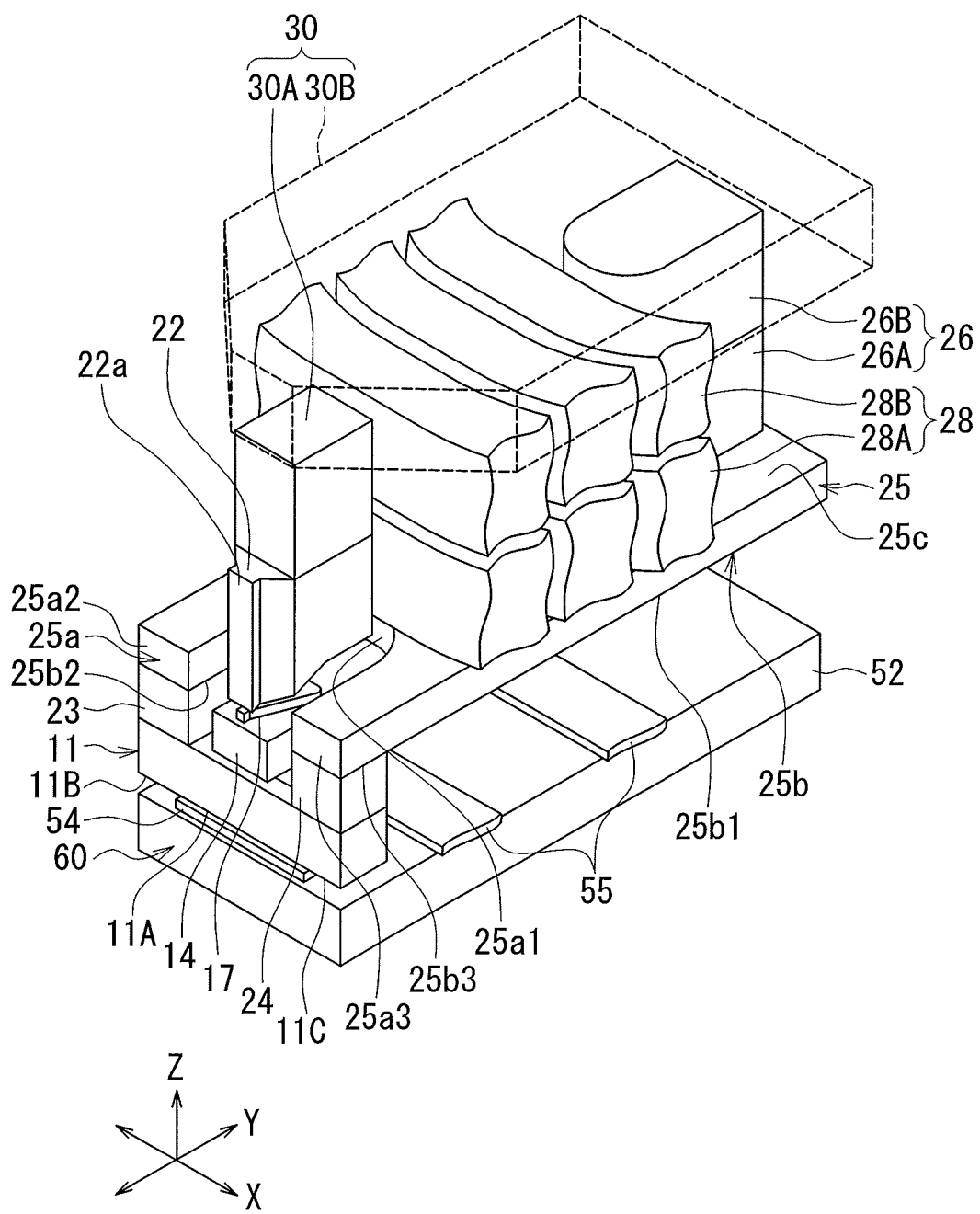
FIG. 1 is a perspective view showing the main part of a thermally-assisted magnetic recording head according to a first embodiment of the invention.
Figure 2:
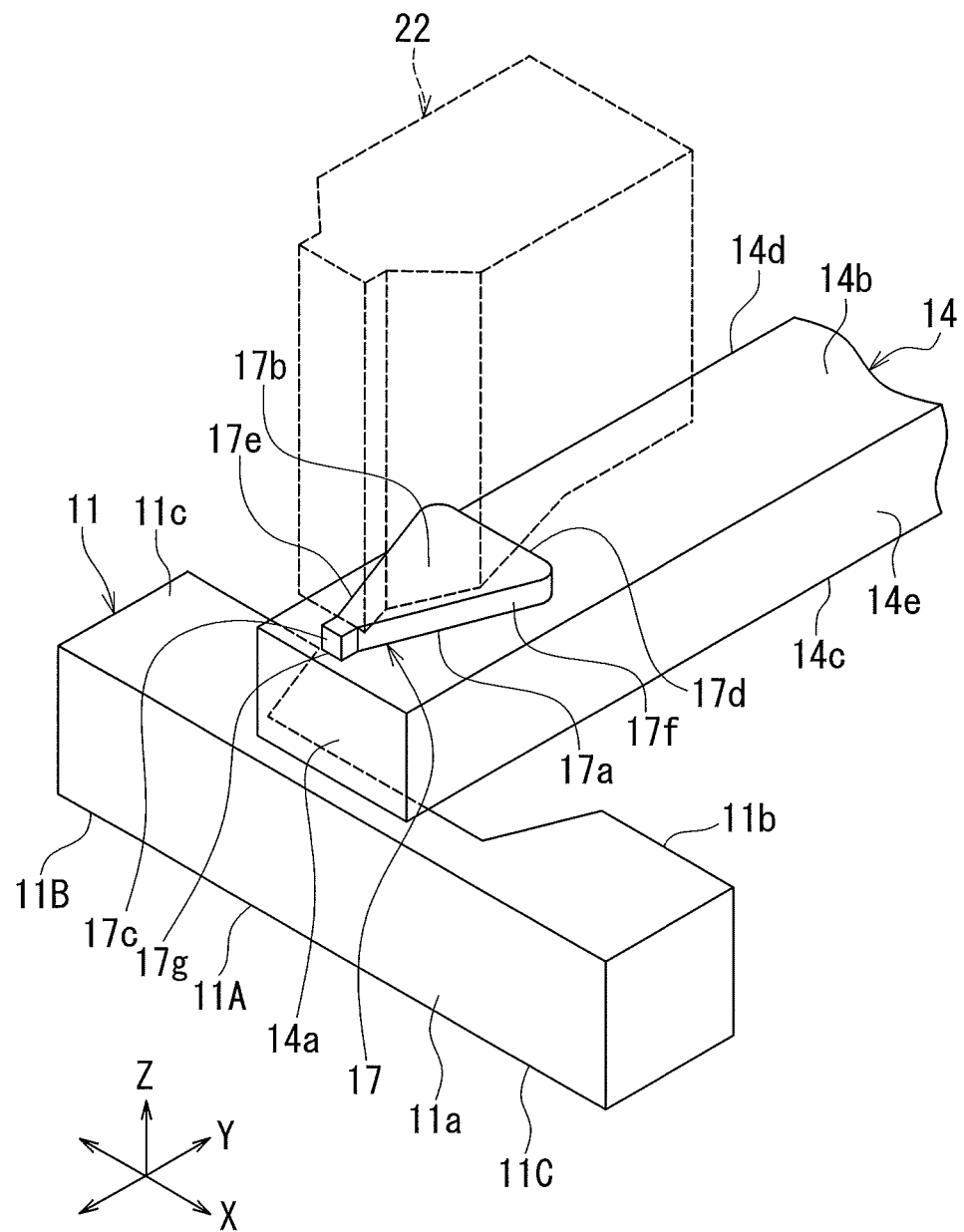
FIG. 2 is a perspective view showing a part of FIG. 1.
Figure 3:
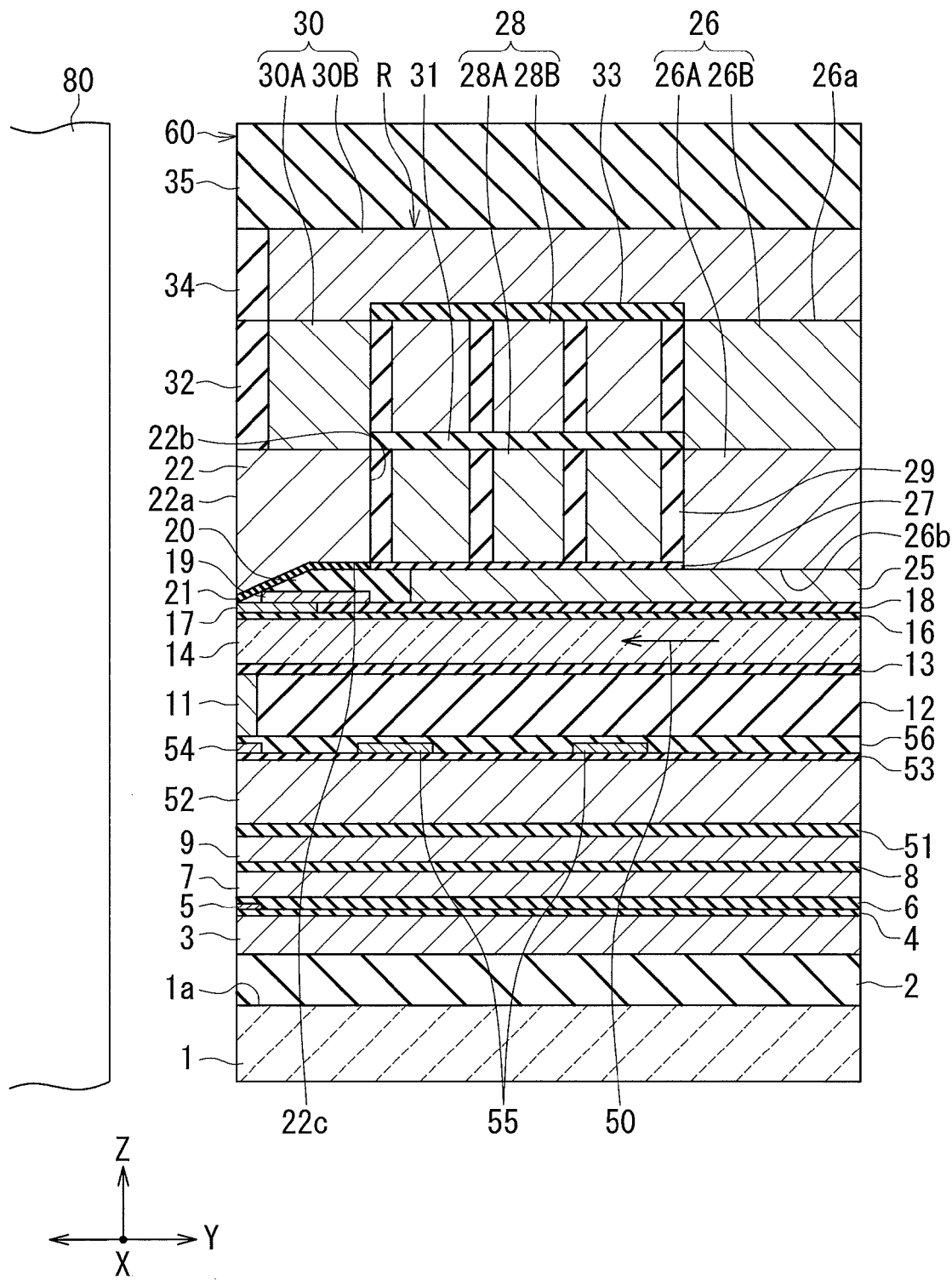
FIG. 3 is a cross-sectional view showing the configuration of the thermally-assisted magnetic recording head according to the first embodiment of the invention.
Figure 4:
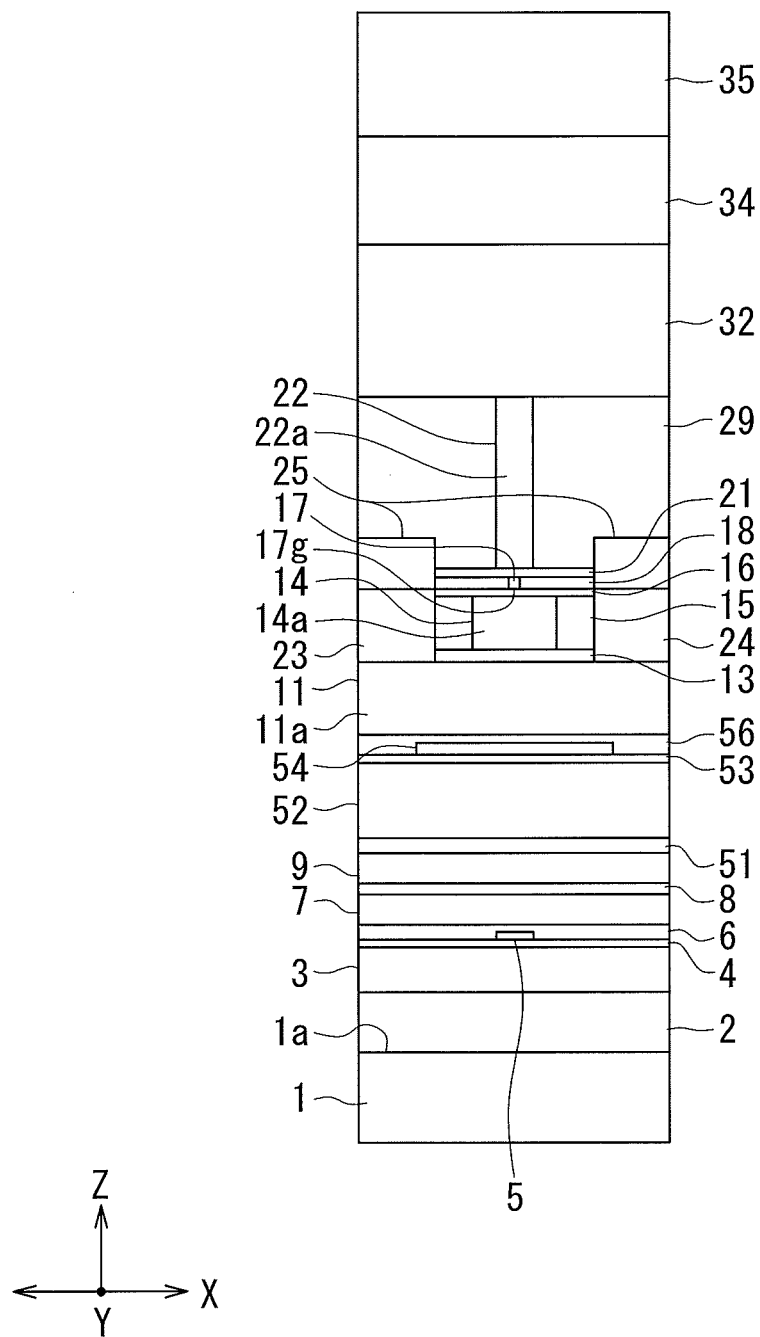
FIG. 4 is a front view showing the medium facing surface of the thermally-assisted magnetic recording head according to the first embodiment of the invention.
Figure 5:
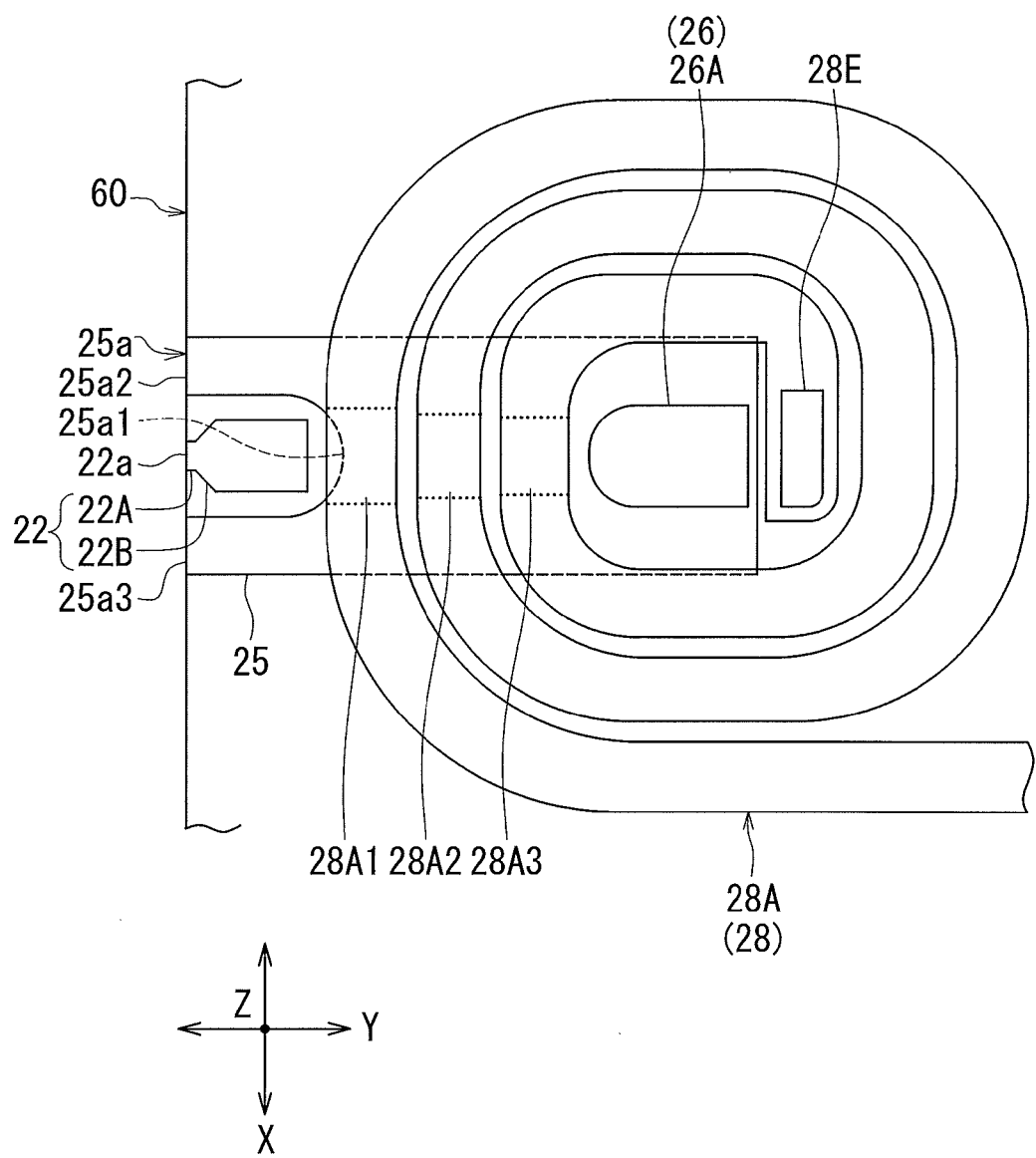
FIG. 5 is a plan view showing a first layer of a coil of the first embodiment of the invention.
Figure 6:
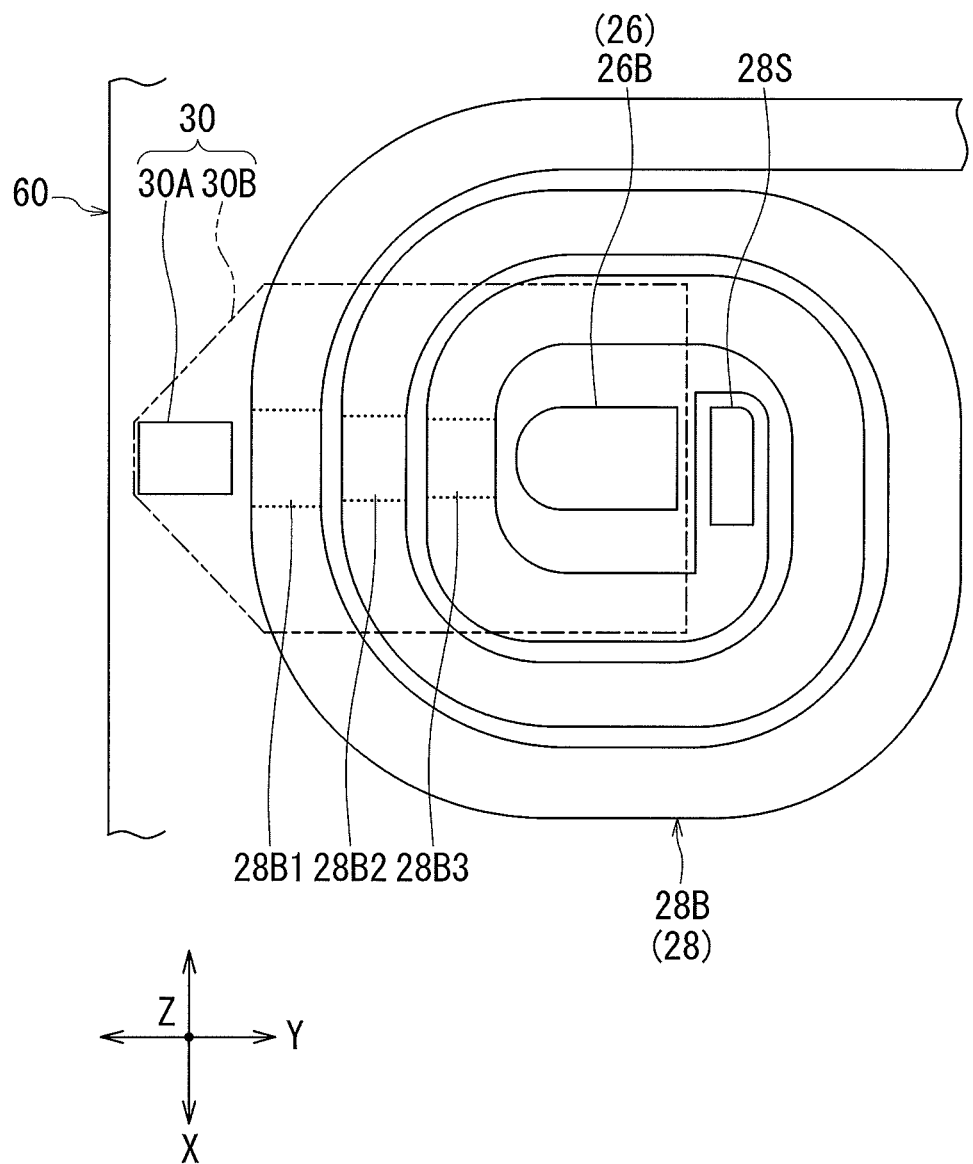
FIG. 6 is a plan view showing a second layer of the coil of the first embodiment of the invention.

Preferred embodiments of the present invention will now be described in detail with reference to the drawings. First, reference is made to FIG. 1 to FIG. 6 to describe the configuration of a thermally-assisted magnetic recording head according to a first embodiment of the invention. FIG. 1 is a perspective view showing the main part of the thermally-assisted magnetic recording head. FIG. 2 is a perspective view showing a part of FIG. 1. FIG. 3 is a cross-sectional view showing the configuration of the thermally-assisted magnetic recording head. FIG. 4 is a front view showing the medium facing surface of the thermally-assisted magnetic recording head. FIG. 5 is a plan view showing a first layer of a coil of the present embodiment. FIG. 6 is a plan view showing a second layer of the coil of the present embodiment.

The thermally-assisted magnetic recording head according to the present embodiment is for use in perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 3, the thermally-assisted magnetic recording head has a medium facing surface 60 facing a recording medium 80. Here, X direction, Y direction, and Z direction will be defined as follows. The X direction is the direction across the tracks of the recording medium 80, i.e., the track width direction. The Y direction is a direction perpendicular to the medium facing surface 60. The Z direction is the direction of travel of the recording medium 80 as viewed from the slider. The X, Y, and Z directions are orthogonal to one another.

As shown in FIG. 3 and FIG. 4, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 60. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head unit. The thermally-assisted magnetic recording head further includes an insulating layer 8 disposed on the top shield layer 7, and a middle shield layer 9 formed of a magnetic material and disposed on the insulating layer 8. The insulating layer 8 is formed of alumina, for example.

The thermally-assisted magnetic recording head further includes: a nonmagnetic layer 51 formed of a nonmagnetic material and disposed on the middle shield layer 9; an expansion layer 52 disposed on the nonmagnetic layer 51; a nonmagnetic layer (not illustrated) formed of a nonmagnetic material, disposed on the nonmagnetic layer 51 and surrounding the expansion layer 52; and a nonmagnetic layer 53 formed of a nonmagnetic material and disposed on the expansion layer 52 and the non-illustrated nonmagnetic layer. The nonmagnetic layers 51 and 53 and the non-illustrated nonmagnetic layer are formed of alumina, for example. The expansion layer 52 will be described in detail later.

The thermally-assisted magnetic recording head further includes: a sensor 54 and a heater 55 disposed on the nonmagnetic layer 53; and a nonmagnetic layer 56 formed of a nonmagnetic material and disposed to cover the nonmagnetic layer 53, the sensor 54 and the heater 55. The sensor 54 is located near the medium facing surface 60. The heater 55 is located farther from the medium facing surface 60 than is the sensor 54. The nonmagnetic layer 56 is formed of alumina, for example. The sensor 54 and the heater 55 will be described in detail later.

The thermally-assisted magnetic recording head further includes a shield 11 formed of a magnetic material and disposed on the nonmagnetic layer 56, and an insulating layer 12 disposed on the nonmagnetic layer 56 and surrounding the shield 11. As shown in FIG. 2, the shield 11 has a second end face 11a located in the medium facing surface 60, a rear end face 11b opposite to the second end face 11a, and a top surface 11c. In addition, the shield 11 includes a central portion 11A, and further includes a first side portion 11B and a second side portion 11C located on opposite sides of the central portion 11A in the track width direction (the X direction). The length of the central portion 11A in the direction perpendicular to the medium facing surface 60 is constant regardless of position in the track width direction. The maximum length of each of the side portions 11B and 11C in the direction perpendicular to the medium facing surface 60 is greater than the length of the central portion 11A in that direction. The insulating layer 12 is formed of alumina, for example.

The thermally-assisted magnetic recording head further includes a waveguide. The waveguide includes a core 14 through which light propagates, and a cladding provided around the core 14. As shown in FIG. 2 in particular, the core 14 has a front end face 14a facing toward the medium facing surface 60, an evanescent light generating surface 14b serving as a top surface, a bottom surface 14c, and two side surfaces 14d and 14e. The front end face 14a may be located in the medium facing surface 60 or at a distance from the medium facing surface 60. FIG. 1 to FIG. 4 show an example in which the front end face 14a is located in the medium facing surface 60.

The cladding includes cladding layers 13, 15 and 16. The cladding layer 13 lies on the shield 11 and the insulating layer 12. The core 14 lies on the cladding layer 13. The cladding layer 15 lies on the cladding layer 13 and surrounds the core 14. The cladding layer 16 is disposed over the evanescent light generating surface 14b of the core 14 and the top surface of the cladding layer 15.

The core 14 is formed of a dielectric material that transmits laser light to be used for generating near-field light. The laser light emitted from a laser diode (not illustrated) enters the core 14 and propagates through the core 14. The cladding layers 13, 15 and 16 are each formed of a dielectric material that has a refractive index lower than that of the core 14. For example, the core 14 may be formed of tantalum oxide such as $Ta_2O_5$ or silicon oxynitride (SiON), whereas the cladding layers 13, 15 and 16 may be formed of silicon dioxide ($SiO_2$) or alumina.

The thermally-assisted magnetic recording head further includes: a plasmon generator 17 disposed above the evanescent light generating surface 14b of the core 14 in the vicinity of the medium facing surface 60 and lying on the cladding layer 16; and a dielectric layer 18 lying on the cladding layer 16 and surrounding the plasmon generator 17. The plasmon generator 17 is configured to excite surface plasmons on the principle to be described later. The plasmon generator 17 is formed of, for example, one of Au, Ag, Al, Cu, Pd, Pt, Rh and Ir, or an alloy composed of two or more of these elements. The dielectric layer 18 is formed of the same material as the cladding layers 13, 15 and 16, for example. The shape of the plasmon generator 17 will be described in detail later.

The thermally-assisted magnetic recording head further includes a nonmagnetic metal layer 19 disposed on the plasmon generator 17 and the dielectric layer 18, and a dielectric layer 20 disposed on the plasmon generator 17, the dielectric layer 18 and the nonmagnetic metal layer 19. Each of the nonmagnetic metal layer 19 and the dielectric layer 20 has an end face facing toward the medium facing surface 60 and located at a distance from the medium facing surface 60. The distance from the medium facing surface 60 to an arbitrary point on the end face of the dielectric layer 20 increases with increasing distance from the arbitrary point to the top surface 1a of the substrate 1. The nonmagnetic metal layer 19 functions as a heat sink for dissipating heat generated at the plasmon generator 17 outward from the plasmon generator 17. The nonmagnetic metal layer 19 is formed of Au, for example. The dielectric layer 20 is formed of the same material as the cladding layers 13, 15 and 16, for example.

The thermally-assisted magnetic recording head further includes an insulating layer 21 lying on the plasmon generator 17 and the dielectric layers 18 and 20, and a main pole 22 lying on the insulating layer 21 such that the plasmon generator 17 is interposed between the main pole 22 and the core 14. The main pole 22 has a first end face 22a located in the medium facing surface 60. The insulating layer 21 is formed of the same material as the cladding layers 13, 15 and 16, for example. The shape of the main pole 22 will be described in detail later.

The thermally-assisted magnetic recording head further includes a second columnar portion 23, a third columnar portion 24 and a second yoke portion 25 each formed of a magnetic material. The second yoke portion 25 is at a predetermined distance from the main pole 22 and lies on the dielectric layer 18. Part of the second yoke portion 25 is embedded in the dielectric layer 20 and the insulating layer 21. The second yoke portion 25 has a front end face 25a facing toward the medium facing surface 60, a bottom surface 25b, and a top surface 25c. As shown in FIG. 1 and FIG. 5, the front end face 25a of the second yoke portion 25 includes a first portion 25a1, and further includes a second portion 25a2 and a third portion 25a3 located on opposite sides of the first portion 25a1 in the track width direction. The first portion 25a1 is shaped to be recessed such that the track-widthwise center of the first portion 25a1 is farthest from the medium facing surface 60. The first portion 25a1 is disposed to surround the nonmagnetic metal layer 19 and the main pole 22. The second and third portions 25a2 and 25a3 are located in the medium facing surface 60 at positions on opposite sides of the first end face 22a of the main pole 22 in the track width direction.

As shown in FIG. 1, the bottom surface 25b of the second yoke portion 25 includes a first portion 25b1 that is located farther from the medium facing surface 60 than is the main pole 22, and further includes a second portion 25b2 and a third portion 25b3 located on opposite sides of the main pole 22 in the track width direction. The second portion 25b2 of the bottom surface 25b is contiguous with the second portion 25a2 of the front end face 25a. The third portion 25b3 of the bottom surface 25b is contiguous with the third portion 25a3 of the front end face 25a.

The second and third columnar portions 23 and 24 are located in the vicinity of the medium facing surface 60 at positions on opposite sides of the core 14 and the plasmon generator 17 in the track width direction. The second and third columnar portions 23 and 24 penetrate the cladding layers 13, 15 and 16, and connect the shield 11 and the second yoke portion 25 to each other. Each of the second and third columnar portions 23 and 24 has a front end face located in the medium facing surface 60, a top surface, and a bottom surface. The bottom surface of the second columnar portion 23 is in contact with a portion of the top surface 11c of the shield 11 that is included in the first side portion 11B. The bottom surface of the third columnar portion 24 is in contact with a portion of the top surface 11c of the shield 11 that is included in the second side portion 11C.

Each of the dielectric layer 18 and the insulating layer 21 has a first opening for exposing the top surface of the second columnar portion 23 and a second opening for exposing the top surface of the third columnar portion 24. The second portion 25b2 of the bottom surface 25b of the second yoke portion 25 is in contact with the top surface of the second columnar portion 23 through the first openings of the dielectric layer 18 and the insulating layer 21. The third portion 25b3 of the bottom surface 25b of the second yoke portion 25 is in contact with the top surface of the third columnar portion 24 through the second openings of the dielectric layer 18 and the insulating layer 21.

The thermally-assisted magnetic recording head further includes a first columnar portion 26 formed of a magnetic material. The first columnar portion 26 has a first end 26a and a second end 26b opposite to each other in the direction of travel of the recording medium 80. In the present embodiment, the first end 26a is an end of the first columnar portion 26 located on the trailing side or the front side in the direction of travel of the recording medium 80, whereas the second end 26b is an end of the first columnar portion 26 located on the leading side or the rear side in the direction of travel of the recording medium 80.

The first columnar portion 26 includes a first layer 26A and a second layer 26B. The first layer 26A includes the second end 26b and lies on a portion of the top surface 25c of the second yoke portion 25 at a position farther from the medium facing surface 60 than the main pole 22. The second layer 26B includes the first end 26a and lies on the first layer 26A. The thermally-assisted magnetic recording head further includes an insulating layer 27 lying on a portion of the top surface of the dielectric layer 20 and another portion of the top surface 25c of the second yoke portion 25 and surrounding the main pole 22 and the first layer 26A. The insulating layer 27 is formed of alumina, for example.

The thermally-assisted magnetic recording head further includes a coil 28. The coil 28 is formed of a conductive material such as copper. The coil 28 includes a first layer 28A and a second layer 28B. The first layer 28A of the coil 28 lies on the insulating layer 27. As shown in FIG. 5, the first layer 28A of the coil 28 is wound approximately three turns around the first layer 26A of the first columnar portion 26. The thermally-assisted magnetic recording head further includes an insulating layer 29. The insulating layer 29 is disposed in the space between adjacent turns of the first layer 28A of the coil 28, and around the main pole 22, the first layer 26A of the first columnar portion 26 and the first layer 28A of the coil 28. Part of the second yoke portion 25 is embedded in the insulating layer 29. The insulating layer 29 is formed of alumina, for example. The shape and location of the first layer 28A will be described in detail later.

The thermally-assisted magnetic recording head further includes a first yoke portion 30 formed of a magnetic material. The first yoke portion 30 includes a first layer 30A and a second layer 30B. The first layer 30A lies on the main pole 22. The first layer 30A has an end face facing toward the medium facing surface 60 and located at a distance from the medium facing surface 60. The thermally-assisted magnetic recording head further includes an insulating layer 31 lying on the first layer 28A of the coil 28 and the insulating layer 29 and surrounding the second layer 26B of the first columnar portion 26 and the first layer 30A of the first yoke portion 30. The insulating layer 31 is formed of alumina, for example.

The second layer 28B of the coil 28 lies on the insulating layer 31. As shown in FIG. 6, the second layer 28B of the coil 28 is wound approximately three turns around the second layer 26B of the first columnar portion 26. The thermally-assisted magnetic recording head further includes insulating layers 32 and 33. The insulating layer 32 is disposed in the space between adjacent turns of the second layer 28B of the coil 28, and around the second layer 26B of the first columnar portion 26, the first layer 30A of the first yoke portion 30 and the second layer 28B of the coil 28. The insulating layer 33 lies on the second layer 28B of the coil 28 and the insulating layer 32. The insulating layers 32 and 33 are formed of alumina, for example. The shape and location of the second layer 28B will be described in detail later.

The second layer 30B of the first yoke portion 30 lies on the first layer 30A of the first yoke portion 30, the second layer 26B of the first columnar portion 26 and the insulating layer 33. The second layer 30B has an end face facing toward the medium facing surface 60 and located at a distance from the medium facing surface 60.

The thermally-assisted magnetic recording head further includes an insulating layer 34 disposed around the second layer 30B of the first yoke portion 30, and a protective layer 35 disposed to cover the second layer 30B and the insulating layer 34. The insulating layer 34 and the protective layer 35 are formed of alumina, for example.

The parts from the shield 11 to the second layer 30B of the first yoke portion 30 constitute a write head unit. The coil 28 produces a magnetic field corresponding to data to be written on the recording medium 80. The shield 11, the second and third columnar portions 23 and 24, the second yoke portion 25, the first columnar portion 26, the first yoke portion 30 and the main pole 22 form a magnetic path for passing a magnetic flux corresponding to the magnetic field produced by the coil 28. The main pole 22 allows the magnetic flux corresponding to the magnetic field produced by the coil 28 to pass, and produces a write magnetic field for writing data on the recording medium 80 by means of a perpendicular magnetic recording system.

As has been described, the thermally-assisted magnetic recording head according to the present embodiment includes the medium facing surface 60, the read head unit, and the write head unit. The read head unit and the write head unit are stacked on the substrate 1. The write head unit is located on the trailing side, i.e., the front side in the direction of travel of the recording medium (the Z direction) relative to the read head unit.

The write head unit includes the coil 28, the main pole 22, the shield 11, the waveguide, and the plasmon generator 17. The waveguide includes the core 14 and the cladding. The cladding includes the cladding layers 13, 15 and 16.

As shown in FIG. 3, the write head unit further includes a return path section R connecting the main pole 22 and the shield 11 to each other and allowing a magnetic flux that corresponds to the magnetic field produced by the coil 28 to pass. The return path section R includes the first yoke portion 30, the second yoke portion 25, the first columnar portion 26, the second columnar portion 23 and the third columnar portion 24. The return path section R is formed of magnetic material since the first yoke portion 30, the second yoke portion 25, the first columnar portion 26, the second columnar portion 23 and the third columnar portion 24 are all formed of magnetic material.

The main pole 22 has the first end face 22a located in the medium facing surface 60. The shield 11 has the second end face 11a located in the medium facing surface 60. The second end face 11a is located on the leading side or the rear side in the direction of travel of the recording medium 80 relative to the first end face 22a.

The core 14 has the front end face 14a located in the medium facing surface 60. The front end face 14a is located between the first end face 22a and the second end face 11a in the direction of travel of the recording medium 80.

As shown in FIG. 3, the first yoke portion 30, the second yoke portion 25 and the first columnar portion 26 are located on the trailing side or the front side in the direction of travel of the recording medium 80 relative to the core 14. As shown in FIG. 3, the first columnar portion 26 is located away from the medium facing surface 60 and has the first end 26a and the second end 26b. As shown in FIG. 1, the second and third columnar portions 23 and 24 are located closer to the medium facing surface 60 than is the first columnar portion 26.

The first yoke portion 30 connects the main pole 22 to the first end 26a of the first columnar portion 26. The second columnar portion 23 and the third columnar portion 24 are located on opposite sides of the plasmon generator 17 in the track width direction and connected to the shield 11. The second yoke portion 25 is connected to the second end 26b of the first columnar portion 26, and connected to the shield 11 via the second and third columnar portions 23 and 24.

The shield 11 captures a disturbance magnetic field applied to the thermally-assisted magnetic recording head from the outside thereof. This makes it possible to prevent the disturbance magnetic field from being intensively captured into the main pole 22 and thereby causing erroneous writing on the recording medium 80. The shield 11 also has the function of capturing a magnetic flux that is produced from the first end face 22a of the main pole 22 and spreads in directions other than the direction perpendicular to the plane of the recording medium 80, and thereby preventing the magnetic flux from reaching the recording medium 80. It is thereby possible to increase the write field intensity gradient. The shield 11 and the return path section R also have the function of allowing a magnetic flux that has been produced from the first end face 22a of the main pole 22 and has magnetized a portion of the recording medium 80 to flow back to the main pole 22.

The thermally-assisted magnetic recording head further includes the heater 55, the expansion layer 52, and a nonmagnetic portion. The heater 55, the expansion layer 52 and the nonmagnetic portion are provided between the read head unit and the write head unit. The heater 55, the expansion layer 52 and the nonmagnetic portion are particularly located on the leading side or the rear side in the direction of travel of the recording medium 80 relative to the core 14. The heater 55 may be located on the front side or the rear side in the direction of travel of the recording medium 80 relative to the expansion layer 52. FIG. 1 and FIG. 3 show an example in which the heater 55 is located on the front side in the direction of travel of the recording medium 80 relative to the expansion layer 52. The nonmagnetic portion is constituted of the nonmagnetic layers 51 and 53 and the non-illustrated nonmagnetic layer surrounding the expansion layer 52. The nonmagnetic portion is formed of nonmagnetic material since the nonmagnetic layers 51 and 53 and the non-illustrated nonmagnetic layer are all formed of nonmagnetic material.

The heater 55 generates heat for causing the medium facing surface 60 to protrude in part. The expansion layer 52 expands under the heat generated by the heater 55 and thereby causes the medium facing surface 60 to protrude in part. The heater 55 includes a line-shaped conductor which generates heat when energized. The line-shaped conductor includes two linear portions extending linearly in the track width direction (the X direction), and a connecting portion connecting one end of one of the two linear portions to one end of the other of the two linear portions. The connecting portion is U-shaped, for example. The thermally-assisted magnetic recording head according to the present embodiment includes a pair of leads (not illustrated) connected to the other ends of the two linear portions. The line-shaped conductor is configured to be energized through the pair of leads to thereby generate heat. For example, the line-shaped conductor is formed of a film of NiCr or a layered film formed by stacking a film of Ta, a film of NiCu and a film of Ta.

The expansion layer 52 is formed of a material that is higher in thermal conductivity and linear thermal expansion coefficient than the nonmagnetic portion. If the nonmagnetic portion (the nonmagnetic layers 51 and 53 and the non-illustrated nonmagnetic layer) is formed of alumina, the expansion layer 52 needs to be formed of a material that is higher in thermal conductivity and linear thermal expansion coefficient than alumina. At 25° C., alumina has a thermal conductivity of around 30 W/m·K. At temperatures in the range of 25° C. to 100° C., alumina has a linear thermal expansion coefficient of around $6.5 \times 10^{-6}$/° C. The expansion layer 52 may be formed a metal material. The metal material used to form the expansion layer 52 may be either a nonmagnetic metal material or a magnetic metal material. Examples of nonmagnetic metal materials that can be used to form the expansion layer 52 include Al, Cu, and Au. Examples of magnetic metal materials that can be used to form the expansion layer 52 include CoFeN, CoNiFe, NiFe, and CoFe.

The components of the thermally-assisted magnetic recording head expand under the heat generated by the heater 55. In particular, the expansion layer 52 is formed of a material that is higher in thermal conductivity than the nonmagnetic portion surrounding the expansion layer 52. The heat generated by the heater 55 is thus distributed within the expansion layer 52 more rapidly and uniformly than in the nonmagnetic portion. Further, the material used to form the expansion layer 52 is higher in linear thermal expansion coefficient than the nonmagnetic portion. Thus, the expansion layer 52 expands under the heat generated by the heater 55 more rapidly and greatly than does the nonmagnetic portion, and thereby causes the medium facing surface 60 to protrude in part. This reduces the distance between the medium facing surface 60 and the surface of the recording medium 80.

The thermally-assisted magnetic recording head further includes the sensor 54. The sensor 54 is intended to detect contact of part of the medium facing surface 60 with the recording medium 80. In the present embodiment, the sensor 54 is located between the read head unit and the write head unit, and lies in the vicinity of the expansion layer 52. The sensor 54 may be located on the front side or the rear side in the direction of travel of the recording medium 80 relative to the expansion layer 52. FIG. 1, FIG. 3 and FIG. 4 show an example in which the sensor 54 is located on the front side in the direction of travel of the recording medium 80 relative to the expansion layer 52, and on the same plane as the heater 55. The sensor 54 is, for example, a resistor that changes in resistance in response to a change in its own temperature upon contact of part of the medium facing surface 60 with the recording medium 80. The resistor extends in the track width direction (the X direction). The thermally-assisted magnetic recording head according to the present embodiment includes a pair of leads (not illustrated) connected to opposite ends of the resistor. The resistor is formed of a metal material or a semiconductor material that changes in resistance at a relatively high rate with respect to a change in temperature, i.e., that has a relatively high temperature coefficient of resistance. Specifically, the resistor may be formed of NiFe, W, Cu, Ni, or Pt, for example.

Upon contact of part of the medium facing surface 60 with the recording medium 80, the frictional heat resulting from the contact raises the temperature of the medium facing surface 60 at and in the vicinity of the part in contact with the recording medium 80. Such a rise in temperature also raises the temperature of the sensor 54 (the resistor) itself. As a result, the sensor 54 changes in resistance. Thus, it is possible to detect contact of part of the medium facing surface 60 with the recording medium 80 by measuring the resistance of the sensor 54 via the pair of leads.

The shape and location of the coil 28 will now be described in detail with reference to FIG. 5 and FIG. 6. As shown in FIG. 5, the first layer 28A of the coil 28 is wound approximately three turns around the first layer 26A of the first columnar portion 26. The first layer 28A of the coil 28 includes a coil connection 28E electrically connected to the second layer 28B of the coil 28, and three conductor portions (hereinafter referred to as linear conductor portions) 28A1, 28A2 and 28A3 interposed between the first layer 26A of the first columnar portion 26 and the medium facing surface 60 and extending linearly in parallel to the medium facing surface 60. The linear conductor portions 28A1, 28A2 and 28A3 are arranged in this order along the direction perpendicular to the medium facing surface 60, the linear conductor portion 28A1 being closest to the medium facing surface 60. Each of the linear conductor portions 28A1 to 28A3 has a constant width in the direction perpendicular to the medium facing surface 60 (the Y direction). In FIG. 5, the positions of opposite ends of each of the linear conductor portions 28A1 to 28A3 in the track width direction (the X direction) are indicated in dotted lines. This also applies to other drawings that show other linear conductor portions.

As shown in FIG. 6, the second layer 28B of the coil 28 is wound approximately three turns around the second layer 26B of the first columnar portion 26. The second layer 28B of the coil 28 includes a coil connection 28S electrically connected to the coil connection 28E of the first layer 28A of the coil 28, and three linear conductor portions 28B1, 28B2 and 28B3 interposed between the second layer 26B of the first columnar portion 26 and the medium facing surface 60. The linear conductor portions 28B1, 28B2 and 28B3 are arranged in this order along the direction perpendicular to the medium facing surface 60, the linear conductor portion 28B1 being closest to the medium facing surface 60. Each of the linear conductor portions 28B1 to 28B3 has a constant width in the direction perpendicular to the medium facing surface 60 (the Y direction).

The coil connection 28S penetrates the insulating layer 31 and is electrically connected to the coil connection 28E. In the example shown in FIG. 5 and FIG. 6, the first layer 28A and the second layer 28B of the coil 28 are connected in series.

An example of the shape of the plasmon generator 17 will now be described with reference to FIG. 2. The plasmon generator 17 has a plasmon exciting part 17a serving as a bottom surface, a top surface 17b, a front end face 17c located in the medium facing surface 60, a rear end face 17d opposite to the front end face 17c, and two side surfaces 17e and 17f. The plasmon exciting part 17a is located at a predetermined distance from the evanescent light generating surface 14b of the core 14 and faces the evanescent light generating surface 14b. The cladding layer 16 is interposed between the plasmon exciting part 17a and the evanescent light generating surface 14b. For example, the plasmon generator 17 is rectangular in cross section parallel to the medium facing surface 60.

The front end face 17c includes a near-field light generating part 17g located at the front extremity of the plasmon exciting part 17a. The near-field light generating part 17g is located between the first end face 22a of the main pole 22 and the second end face 11a of the shield 11. In the present embodiment, the first end face 22a is located on the front side in the direction of travel of the recording medium 80 relative to the near-field light generating part 17g. The near-field light generating part 17g generates near-field light on the principle to be described later.

As shown in FIG. 2, the plasmon generator 17 includes a narrow portion located in the vicinity of the medium facing surface 60 and a wide portion that is located farther from the medium facing surface 60 than is the narrow portion. The narrow portion has a front end face located in the medium facing surface 60. The front end face of the narrow portion also serves as the front end face 17c of the plasmon generator 17. The width of the narrow portion in the direction parallel to the medium facing surface 60 and to the top surface 1a of the substrate 1 (the X direction) may be constant regardless of the distance from the medium facing surface 60 or may decrease with increasing proximity to the medium facing surface 60. The wide portion is located on a side of the narrow portion farther from the front end face 17c and is coupled to the narrow portion. The width of the wide portion is the same as that of the narrow portion at the boundary between the narrow portion and the wide portion, and increases with increasing distance from the narrow portion.

The width (the dimension in the track width direction (the X direction)) of the front end face 17c is defined by the width of the narrow portion in the medium facing surface 60. The width of the front end face 17c falls within the range of 5 to 40 nm, for example. The height (the dimension in the Z direction) of the front end face 17c is defined by the height of the narrow portion in the medium facing surface 60. The height of the front end face 17c falls within the range of 5 to 40 nm, for example.

An example of the shape of the main pole 22 will now be described with reference to FIG. 3 and FIG. 5. As shown in FIG. 3, the main pole 22 has the first end face 22a, and further has a rear end face 22b opposite to the first end face 22a, and a bottom surface 22c. The bottom surface 22c includes an inclined portion and a flat portion arranged in this order, the inclined portion being closer to the medium facing surface 60. The distance from the top surface 1a of the substrate 1 to an arbitrary point on the inclined portion increases with increasing distance from the arbitrary point to the medium facing surface 60. The inclined portion is opposed to a portion of the top surface 17b of the plasmon generator 17 with the insulating layer 21 interposed therebetween. The flat portion extends in a direction substantially perpendicular to the medium facing surface 60.

As shown in FIG. 5, the main pole 22 includes a narrow portion 22A and a wide portion 22B. The narrow portion 22A has an end face located in the medium facing surface 60 and an end opposite to the end face. The wide portion 22B is connected to the end of the narrow portion 22A. The wide portion 22B is greater than the narrow portion 22A in width in the track width direction (the X direction). The width of the narrow portion 22A in the track width direction is generally constant regardless of the distance from the medium facing surface 60. The width of the wide portion 22B in the track width direction is the same as that of the narrow portion 22A at the boundary between the narrow portion 22A and the wide portion 22B, and gradually increases with increasing distance from the medium facing surface 60, then becoming constant. The narrow portion 22A has a length in the range of, for example, 0 to 0.3 μm in the direction perpendicular to the medium facing surface 60. Where this length is 0, the narrow portion 22A is not present and thus the wide portion 22B has an end face located in the medium facing surface 60.

The distance between the bottom surface 22c of the main pole 22 and the evanescent light generating surface 14b of the core 14 increases with increasing distance from the medium facing surface 60. This feature of the present embodiment makes it possible to prevent the light propagating through the core 14 from being absorbed in part by the main pole 22 and to prevent the surface plasmons excited on the plasmon exciting part 17a from being absorbed in part by the main pole 22.

Now, the principle of generation of near-field light in the present embodiment and the principle of thermally-assisted magnetic recording using near-field light will be described in detail. Laser light emitted from a laser diode (not illustrated) enters the core 14. As shown in FIG. 3, the laser light 50 propagates through the core 14 toward the medium facing surface 60, and reaches the vicinity of the plasmon generator 17. The evanescent light generating surface 14b of the core 14 generates evanescent light based on the laser light 50 propagating through the core 14. More specifically, the laser light 50 is totally reflected at the evanescent light generating surface 14b, and the evanescent light generating surface 14b thereby generates evanescent light that permeates into the cladding layer 16. In the plasmon generator 17, surface plasmons are excited on the plasmon exciting part 17a through coupling with the aforementioned evanescent light. The surface plasmons propagate to the near-field light generating part 17g, and the near-field light generating part 17g generates near-field light based on the surface plasmons.

The near-field light generated from the near-field light generating part 17g is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 22 for data writing.

The specific functions and effects of the thermally-assisted magnetic recording head according to the present embodiment will now be described. In the present embodiment, the near-field light generating part 17g of the plasmon generator 17 is located between the first end face 22a of the main pole 22 and the second end face 11a of the shield 11. Part of the core 14 is located in the vicinity of the plasmon generator 17. The core 14 and the return path section R are configured to intersect each other without contacting each other. More specifically, the second and third columnar portions 23 and 24 of the return path section R are located on opposite sides of the core 14 in the track width direction without contacting the core 14.

In the present embodiment, the first yoke portion 30, the second yoke portion 25 and the first columnar portion 26 of the return path section R are located on the front side in the direction of travel of the recording medium 80 relative to the core 14, and the coil 28 is wound around the first columnar portion 26. The present embodiment allows the first columnar portion 26 to be small in width in the track width direction regardless of the distance between the respective outer ends of the second and third columnar portions 23 and 24 in the track width direction. The present embodiment thus allows the coil 28 to be small in entire length.

In order to improve the write characteristics in a high frequency band, it is desirable that the magnetic path formed by the main pole 22, the shield 11 and the return path section R be reduced in length. To achieve this, it is effective to bring the first columnar portion 26 into close proximity to the medium facing surface 60. In the present embodiment, the coil 28 is wound around the first columnar portion 26 which is small in width in the track width direction. Accordingly, even if the first columnar portion 26 is brought into close proximity to the medium facing surface 60, it is possible to avoid an increase in length of each of the linear conductor portions 28A1 to 28A3 of the first layer 28A of the coil 28 located between the first layer 26A of the first columnar portion 26 and the medium facing surface 60 and an increase in length of each of the linear conductor portions 28B1 to 28B3 of the second layer 28B of the coil 28 located between the second layer 26B of the first columnar portion 26 and the medium facing surface 60. The present embodiment thus allows the first columnar portion 26 to be located close to the medium facing surface 60 without causing a significant increase in resistance of the coil 28. Consequently, the present embodiment makes it possible to reduce the length of the magnetic path while preventing an increase in resistance of the coil 28.

Further, in the present embodiment, the heater 55 and the expansion layer 52 are located on the rear side in the direction of travel of the recording medium 80 relative to the core 14. By virtue of the functions of the heater 55 and the expansion layer 52 described previously, the present embodiment allows the medium facing surface 60 to protrude in part. The expansion layer 52 is higher in thermal conductivity and linear thermal expansion coefficient than the nonmagnetic portion surrounding the expansion layer 52. Thus, the expansion layer 52 expands under the heat generated by the heater 55 and thereby protrudes toward the recording medium 80 rapidly and greatly. The present embodiment thereby makes it possible that a portion of the medium facing surface 60 near the expansion layer 52 is brought into closer proximity to the recording medium 80 when compared with the near-field light generating part 17g of the plasmon generator 17. As a result, in the present embodiment, even if the portion of the medium facing surface 60 near the expansion layer 52 comes into contact with the recording medium 80 during the operation of the thermally-assisted magnetic recording head, another portion of the medium facing surface 60 near the plasmon generator 17 can be prevented from coming into contact with the recording medium 80. The present embodiment thus allows for protection of the plasmon generator 17.

Further, in the present embodiment, the first yoke portion 30, the second yoke portion 25, the first columnar portion 26 and the coil 28 are located on the front side in the direction of travel of the recording medium 80 relative to the core 14. No yoke portion or coil is present on the rear side in the direction of travel of the recording medium 80 relative to the core 14. The present embodiment thus allows the heater 55, the expansion layer 52, the nonmagnetic portion and the sensor 54 to be easily disposed between the read head unit and the core 14.

Consequently, the present embodiment is able to provide a thermally-assisted magnetic recording head that exhibits excellent write characteristics in a high frequency band and that is capable of protecting the plasmon generator 17.

Second Embodiment

Figure 7:
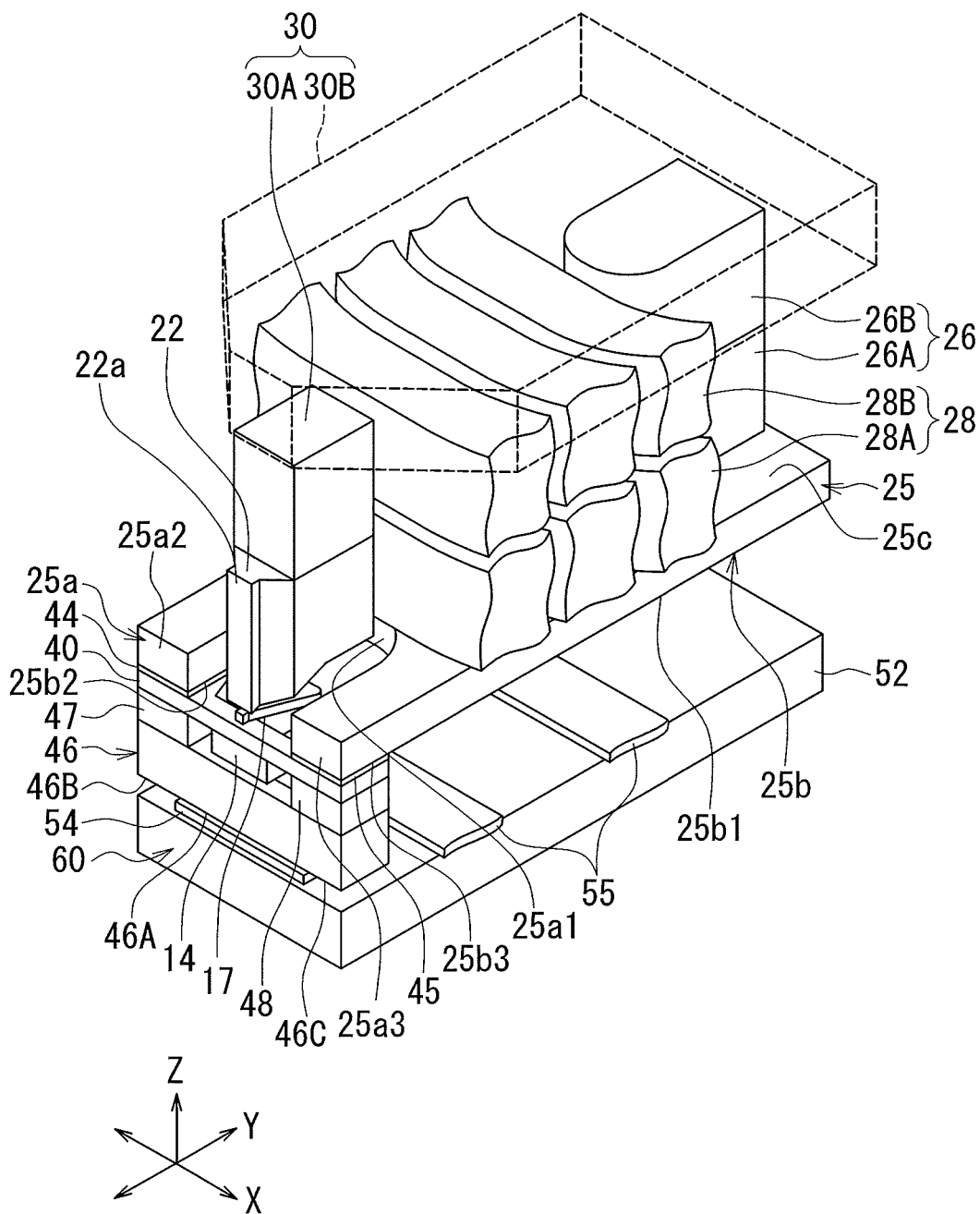
FIG. 7 is a perspective view showing the main part of a thermally-assisted magnetic recording head according to a second embodiment of the invention.
Figure 8:
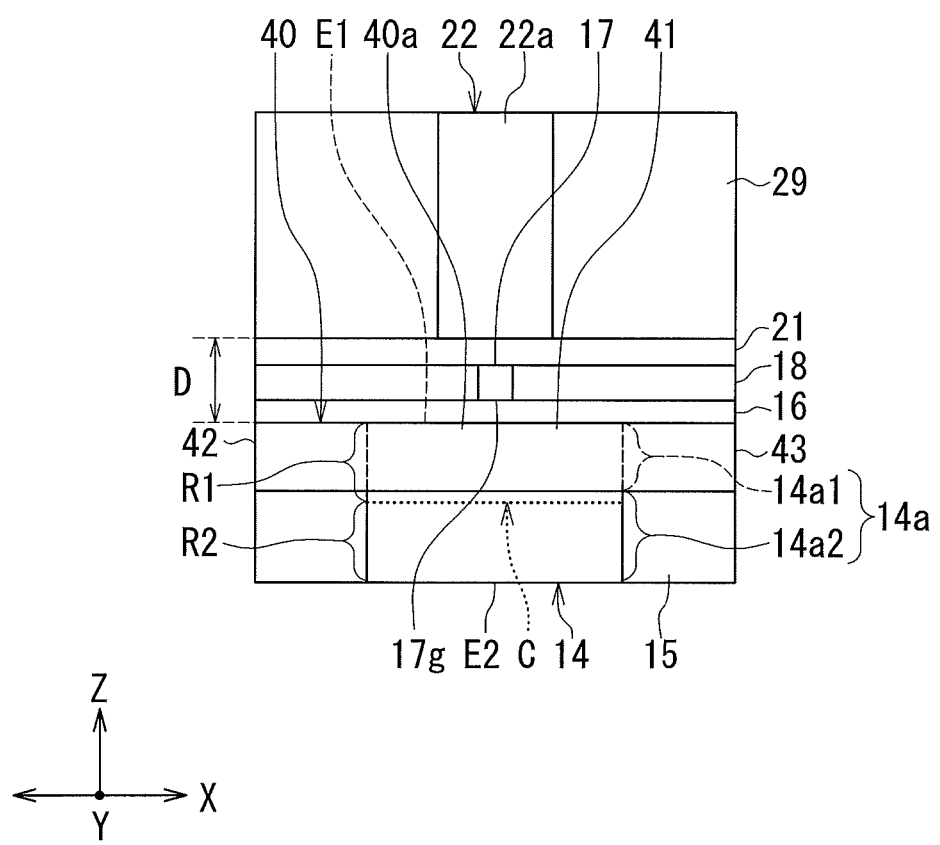
FIG. 8 is a front view showing the main part of the thermally-assisted magnetic recording head according to the second embodiment of the invention.
Figure 9:
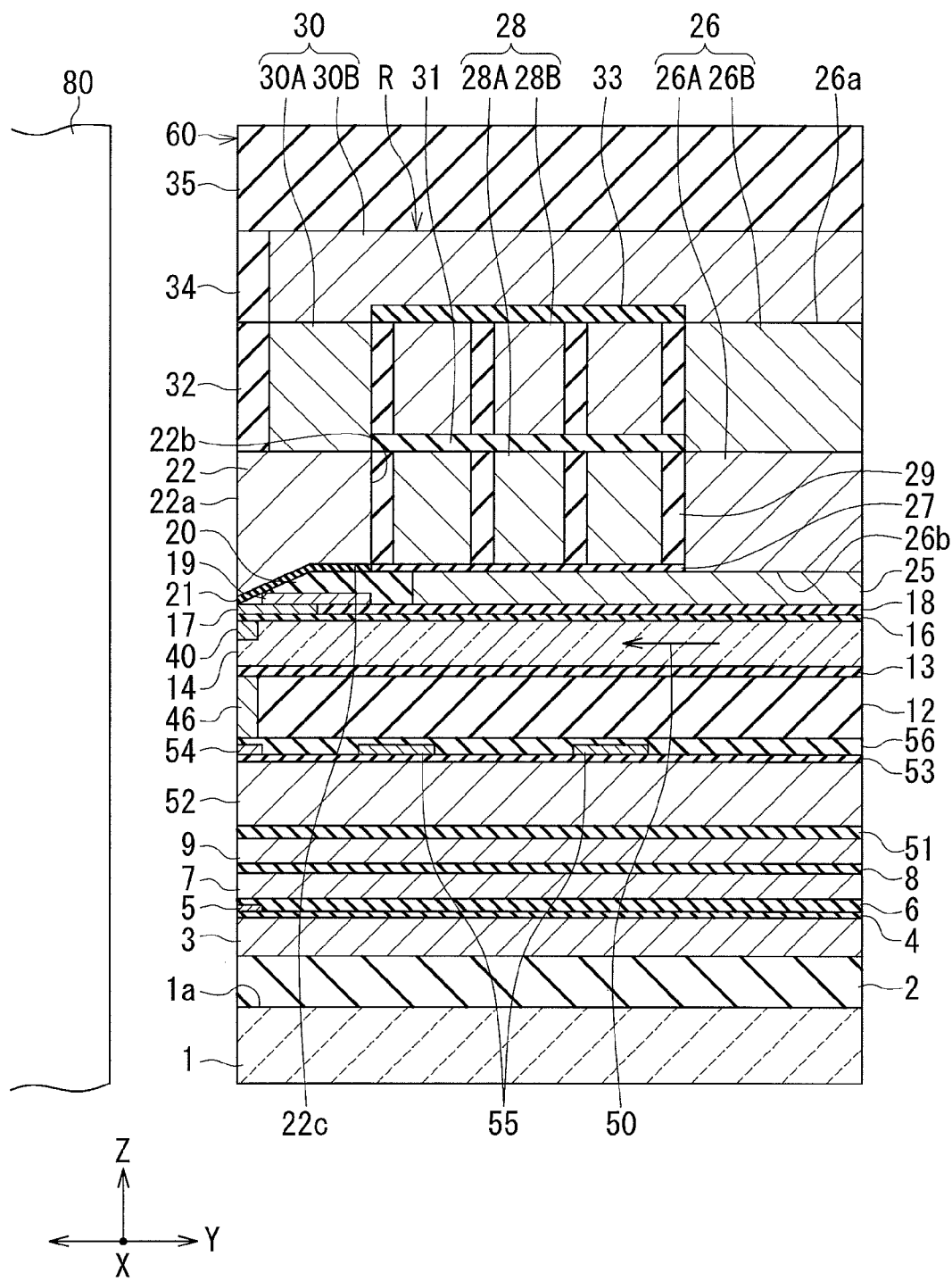
FIG. 9 is a cross-sectional view showing the configuration of the thermally-assisted magnetic recording head according to the second embodiment of the invention.
Figure 10:
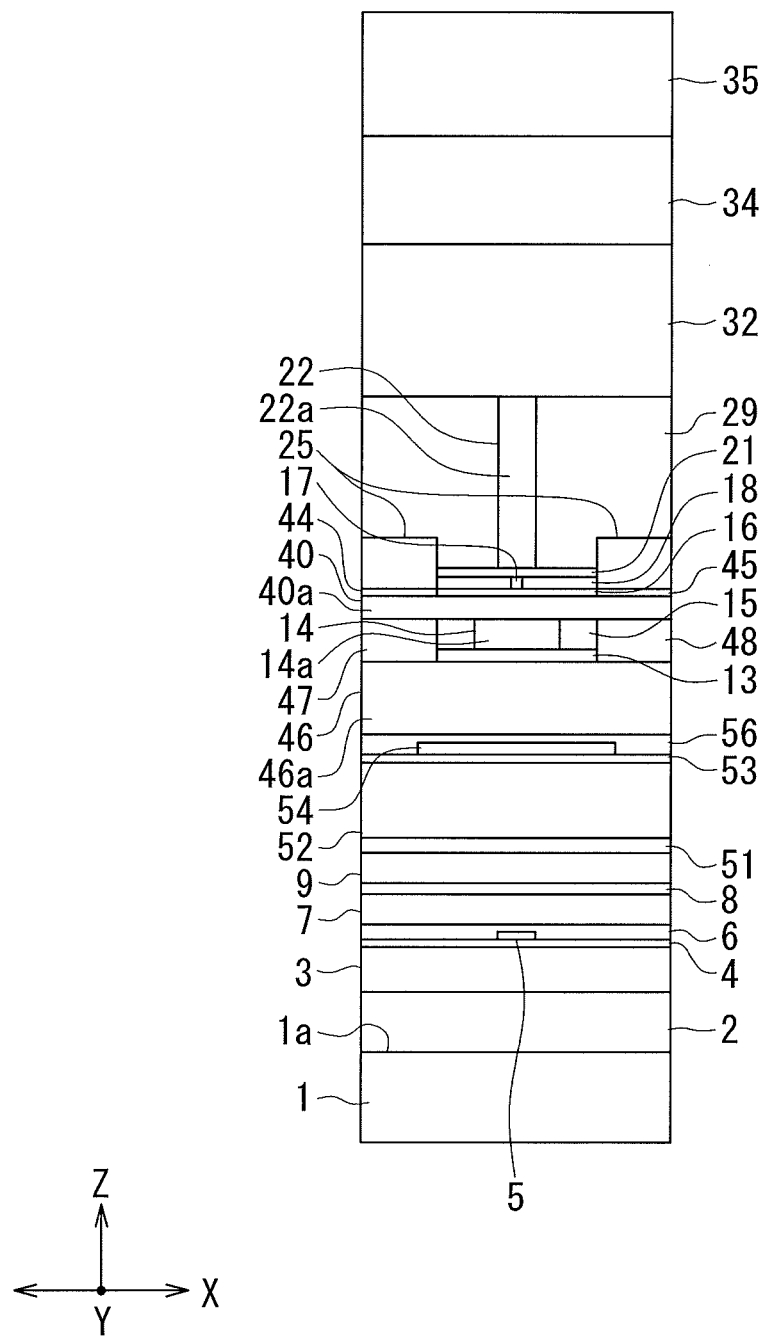
FIG. 10 is a front view showing the medium facing surface of the thermally-assisted magnetic recording head according to the second embodiment of the invention.
Figure 11:
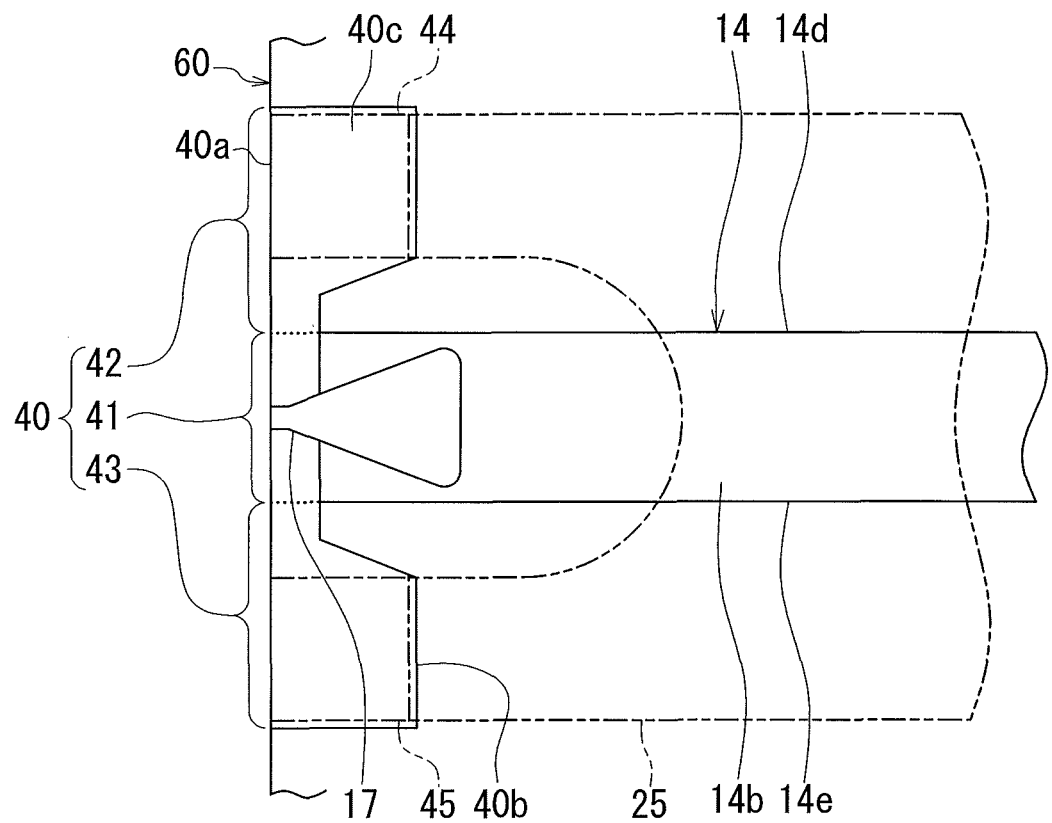
FIG. 11 is a plan view showing a part of the thermally-assisted magnetic recording head according to the second embodiment of the invention.

A thermally-assisted magnetic recording head according to a second embodiment of the invention will now be described with reference to FIG. 7 to FIG. 11. FIG. 7 is a perspective view showing the main part of the thermally-assisted magnetic recording head. FIG. 8 is a front view showing the main part of the thermally-assisted magnetic recording head. FIG. 9 is a cross-sectional view showing the configuration of the thermally-assisted magnetic recording head. FIG. 10 is a front view showing the medium facing surface of the thermally-assisted magnetic recording head. FIG. 11 is a plan view showing a part of the thermally-assisted magnetic recording head.

The configuration of the thermally-assisted magnetic recording head according to the present embodiment differs from that of the head according to the first embodiment in the following ways. The thermally-assisted magnetic recording head according to the present embodiment includes a shield 40 formed of a magnetic material, in place of the shield 11. The shield 40 is located near the front end face 14a of the core 14.

The shapes and locations of the shield 40 and the core 14 will now be described in detail with reference to FIG. 7, FIG. 8 and FIG. 11. The shield 40 has a second end face 40a located in the medium facing surface 60, a rear end face 40b opposite to the second end face 40a, a top surface 40c, and a bottom surface. The shield 40 is shaped to be greater in dimension in the track width direction (the X direction) than in dimension in the direction perpendicular to the top surface 1a of the substrate 1 (the Z direction).

The second end face 40a of the shield 40 is located on the rear side in the direction of travel of the recording medium 80 relative to the first end face 22a of the main pole 22. The near-field light generating part 17g is located between the first end face 22a and the second end face 40a. As shown in FIG. 8, the distance between the first end face 22a and the second end face 40a will be represented by reference letter D. The distance D is preferably in the range of 50 to 300 nm and more preferably in the range of 50 to 100 nm.

As shown in FIG. 8, the front end face 14a of the core 14 includes a first portion 14a1 located away from the medium facing surface 60 and a second portion 14a2 located in the medium facing surface 60. The second portion 14a2 is located on the rear side in the direction of travel of the recording medium 80 relative to the first portion 14a1. Further, there is a difference in level between the first portion 14a1 and the second portion 14a2. Note that the whole of the front end face 14a may be located away from the medium facing surface 60.

As shown in FIG. 8, the front end face 14a has a first edge E1 and a second edge E2 opposite to each other in the direction of travel of the recording medium 80 (the Z direction). The first edge E1 is located on the front side in the direction of travel of the recording medium 80 relative to the second edge E2. The first edge E1 is thus located closer to the near-field light generating part 17g than is the second edge E2. The first edge E1 also serves as the front end of the first portion 14a1 in the direction of travel of the recording medium 80. The second edge E2 also serves as the rear end of the second portion 14a2 in the direction of travel of the recording medium 80.

In FIG. 8, the dotted line indicates the midpoint position between the first edge E1 and the second edge E2. This midpoint position will hereinafter be represented by reference letter C. Further, the front end face 14a is divided into two regions: a first region R1 extending from the midpoint position C to the first edge E1; and a second region R2 extending from the midpoint position C to the second edge E2. The first region R1 includes the first portion 14a1 and a part of the second portion 14a2. The second region R2 includes the remainder of the second portion 14a2.

The shield 40 overlaps only the first region R1 of the front end face 14a of the core 14 when viewed in the direction perpendicular to the medium facing surface 60 (the Y direction). The shield 40 particularly overlaps only the first portion 14a1 of the first region R1. A part of the rear end face 40b of the shield 40 is opposed to the first portion 14a1. The part of the rear end face 40b may or may not be in contact with the first portion 14a1. In the latter case, a part of the cladding may be interposed between the part of the rear end face 40b and the first portion 14a1.

The shield 40 includes an overlapping portion 41 which overlaps the first region R1 (the first portion 14a1) when viewed in the direction perpendicular to the medium facing surface 60, and further includes a first non-overlapping portion 42 and a second non-overlapping portion 43 located on opposite sides of the overlapping portion 41 in the track width direction (the X direction). In FIG. 11, the boundaries between the overlapping portion 41 and the first and second non-overlapping portions 42 and 43 are indicated in dotted lines. The length of the overlapping portion 41 in the direction perpendicular to the medium facing surface 60 is constant regardless of position in the track width direction.

The first and second non-overlapping portions 42 and 43 are located on opposite sides of the front end face 14a of the core 14 in the track width direction when viewed in the direction perpendicular to the medium facing surface 60. Thus, the first and second non-overlapping portions 42 and 43 do not overlap the front end face 14a. The maximum length of each of the first and second non-overlapping portions 42 and 43 in the direction perpendicular to the medium facing surface 60 is greater than the length of the overlapping portion 41 in that direction.

The top surface 40c of the shield 40 and the evanescent light generating surface 14b of the core 14 are coplanar. Alternatively, the top surface 40c and the evanescent light generating surface 14b may be located at different levels in the direction of travel of the recording medium 80 (the Z direction). The plasmon exciting part 17a of the plasmon generator 17 is located at a predetermined distance from each of the top surface 40c and the evanescent light generating surface 14b, and faces the top surface 40c and the evanescent light generating surface 14b. A part of the cladding layer 16 is interposed between the plasmon exciting part 17a and each of the top surface 40c and the evanescent light generating surface 14b.

The return path section R of the present embodiment includes a second columnar portion 44 and a third columnar portion 45 each formed of a magnetic material, in place of the second and third columnar portions 23 and 24. As shown in FIG. 7, the second and third columnar portions 44 and 45 are located closer to the medium facing surface 60 than is the first columnar portion 26 of the return path section R. The second and third columnar portions 44 and 45 are located in the vicinity of the medium facing surface 60 at positions on opposite sides of the core 14 and the plasmon generator 17 in the track width direction, and are embedded in the cladding layer 16. Each of the second and third columnar portions 44 and 45 has a front end face located in the medium facing surface 60, a top surface, and a bottom surface.

The second columnar portion 44 is connected to the first non-overlapping portion 42. More specifically, the bottom surface of the second columnar portion 44 is in contact with a portion of the top surface 40c of the shield 40 that is included in the first non-overlapping portion 42. The third columnar portion 45 is connected to the second non-overlapping portion 43. More specifically, the bottom surface of the third columnar portion 45 is in contact with a portion of the top surface 40c of the shield 40 that is included in the second non-overlapping portion 43.

The second yoke portion 25 of the return path section R is connected to the shield 40 via the second and third columnar portions 44 and 45. More specifically, the second portion 25b2 of the bottom surface 25b of the second yoke portion 25 is in contact with the top surface of the second columnar portion 44 through the first openings of the dielectric layer 18 and the insulating layer 21. The third portion 25b3 of the bottom surface 25b of the second yoke portion 25 is in contact with the top surface of the third columnar portion 45 through the second openings of the dielectric layer 18 and the insulating layer 21.

The thermally-assisted magnetic recording head according to the present embodiment includes a sub-shield 46, a fourth columnar portion 47, and a fifth columnar portion 48 each formed of a magnetic material. The sub-shield 46 is shaped and located in the same manner as the shield 11 of the first embodiment. More specifically, the sub-shield 46 is disposed on the nonmagnetic layer 56 and has a front end face 46a located in the medium facing surface 60, a rear end face opposite to the front end face, and a top surface. In addition, the sub-shield 46 includes a central portion 46A, and further includes a first side portion 46B and a second side portion 46C located on opposite sides of the central portion 46A in the track width direction (the X direction). The length of the central portion 46A in the direction perpendicular to the medium facing surface 60 is constant regardless of position in the track width direction. The maximum length of each of the side portions 46B and 46C in the direction perpendicular to the medium facing surface 60 is greater than the length of the central portion 46A in that direction.

The fourth and fifth columnar portions 47 and 48 are located in the vicinity of the medium facing surface 60 at positions on opposite sides of the core 14 in the track width direction. The fourth and fifth columnar portions 47 and 48 penetrate the cladding layers 13 and 15, and connect the shield 40 and the sub-shield 46 to each other. Each of the fourth and fifth columnar portions 47 and 48 has a front end face located in the medium facing surface 60, a top surface, and a bottom surface. The top surface of the fourth columnar portion 47 is in contact with a portion of the bottom surface of the shield 40 that is included in the first non-overlapping portion 42. The bottom surface of the fourth columnar portion 47 is in contact with a portion of the top surface of the sub-shield 46 that is included in the first side portion 46B. The top surface of the fifth columnar portion 48 is in contact with a portion of the bottom surface of the shield 40 that is included in the second non-overlapping portion 43. The bottom surface of the fifth columnar portion 48 is in contact with a portion of the top surface of the sub-shield 46 that is included in the second side portion 46C.

The sub-shield 46, the fourth columnar portion 47 and the fifth columnar portion 48 are not essential components of the thermally-assisted magnetic recording head, and can be dispensed with.

The specific functions and effects of the thermally-assisted magnetic recording head according to the present embodiment will now be described. The shield 40 has the same functions as those of the shield 11 described in the first embodiment section. Specifically, the shield 40 has the functions of: capturing a disturbance magnetic field applied to the thermally-assisted magnetic recording head from the outside thereof; capturing a magnetic flux that is produced from the first end face 22a of the main pole 22 and spreads in directions other than the direction perpendicular to the plane of the recording medium 80, and thereby preventing the magnetic flux from reaching the recording medium 80; and allowing a magnetic flux that has been produced from the first end face 22a of the main pole 22 and has magnetized a portion of the recording medium 80 to flow back to the main pole 22.

In the present embodiment, when viewed in the direction perpendicular to the medium facing surface 60, the shield 40 overlaps only the first region R1 of the front end face 14a of the core 14, the first region R1 being located closer to the main pole 22 than the other region of the front end face 14a. The present embodiment thus allows the first end face 22a of the main pole 22 and the second end face 40a of the shield 40 to be located closer to each other than in the first embodiment. More specifically, the present embodiment allows the first end face 22a and the second end face 40a to be in close proximity to each other easily so that the distance D falls within the range of 50 to 300 nm. Consequently, the present embodiment allows the above-described functions of shield 40 to be effectively exerted to increase the write field intensity gradient. The lower limit of the distance D (50 nm) is a distance necessary to place the near-field light generating part 17g between the first end face 22a and the second end face 40a. To increase the write field intensity gradient, the distance D should be as small as possible. In view of the foregoing, the distance D is preferably in the range of 50 to 300 nm and more preferably in the range of 50 to 100 nm.

In the present embodiment, the near-field light generating part 17g of the plasmon generator 17 is located in the medium facing surface 60 and lies between the first end face 22a and the second end face 40a. This allows for producing a write magnetic field of a large write field intensity gradient in the vicinity of the near-field light generating part 17g. Consequently, the present embodiment allows for an increase in linear recording density.

If the shield 40 and the front end face 14a of the core 14 are opposed to each other over a large area, the light 50 propagating through the core 14 may pass through the front end face 14a and enter the shield 40, thereby causing the shield 40 to be heated and expand. This will result in the problem that the shield 40 will protrude toward the recording medium 80 and thus readily collide with the recording medium 80. In order to avoid this problem, the distance between the medium facing surface 60 and the recording medium 80 could be increased. However, this would lead to deterioration in write characteristics such as the overwrite property or to an increase in error rate. In contrast to this, the present embodiment is configured so that the shield 40 overlaps only the first region R1 of the front end face 14a when viewed in the direction perpendicular to the medium facing surface 60. More specifically, the shield 40 is not present between at least the second region R2 of the front end face 14a and the medium facing surface 60. The present embodiment thus prevents the shield 40 and the front end face 14a of the core 14 from being opposed to each other over a large area, thereby precluding the aforementioned problem.

To preclude the aforementioned problem with higher reliability, the region of the front end face 14a that the shield 40 overlaps when viewed in the direction perpendicular to the medium facing surface 60 may be only a region extending from a position that is located closer to the first edge E1 (not coinciding with the first edge E1) than is the midpoint position C to the first edge E1.

Further, in the present embodiment, the shield 40 is shaped to be greater in dimension in the track width direction (the X direction) than in dimension in the direction perpendicular to the top surface 1a of the substrate 1 (the Z direction). Consequently, even though the shield 40 overlaps only the first region R1 of the front end face 14a, it is possible to connect the second and third columnar portions 44 and 45 to two portions of the shield 40 that are opposite in the track width direction.

In the present embodiment, the shield 40 formed of a magnetic metal material is provided on the leading side of the plasmon generator 17, particularly in the vicinity of the near-field light generating part 17g. Since the top surface 40c of the shield 40 is located close to the plasmon exciting part 17a of the plasmon generator 17, surface plasmons are excited also on the top surface 40c. Then, the electric line of force produced by the surface plasmons on the plasmon exciting part 17a and the electric line of force produced by the surface plasmons on the top surface 40c of the shield 40 are coupled to each other in the vicinity of the near-field light generating part 17g. This produces a high-density electric line of force in a narrow area in the vicinity of the near-field light generating part 17g. The spread of the near-field light generated by the near-field light generating part 17g is thereby suppressed. Thus, the shield 40 of the present embodiment has also the function of suppressing the spread of near-field light. By virtue of this function, the present embodiment allows for a reduction in track width to achieve an increase in recording density.

Further, in the present embodiment, the maximum length of each of the first and second non-overlapping portions 42 and 43 of the shield 40 in the direction perpendicular to the medium facing surface 60 is greater than the length of the overlapping portion 41 of the shield 40 in that direction. This feature of the present embodiment makes it possible to enhance the aforementioned function of the shield 40 while preventing magnetic flux from being saturated at some midpoint in the shield 40.

Further, in the present embodiment, the sub-shield 46 has the functions of capturing a disturbance magnetic field applied to the thermally-assisted magnetic recording head from the outside thereof; capturing a magnetic flux that is produced from the first end face 22a of the main pole 22 and spreads in directions other than the direction perpendicular to the plane of the recording medium 80, and thereby preventing the magnetic flux from reaching the recording medium 80; and allowing a magnetic flux that has been produced from the first end face 22a of the main pole 22 and has magnetized a portion of the recording medium 80 to flow back to the main pole 22, as does the shield 40. Further, the sub-shield 46, the fourth columnar portion 47 and the fifth columnar portion 48 have the function of preventing magnetic flux from being saturated in the shield 40. The present embodiment thus makes it possible to enhance the the aforementioned function of the shield 40 further.

The remainder of configuration, function and effects of the present embodiment are similar to those of the first embodiment.

The present invention is not limited to the foregoing embodiments, and various modifications may be made thereto. For example, as far as the requirements of the appended claims are met, the shapes and locations of the heater 55, the expansion layer 52 and the sensor 54 are not limited to the respective examples illustrated in the foregoing embodiments but can be chosen as desired.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:
   a medium facing surface facing a recording medium;
   a coil producing a magnetic field that corresponds to data to be written on the recording medium;
   a main pole having a first end face located in the medium facing surface, the main pole allowing a magnetic flux that corresponds to the magnetic field produced by the coil to pass, and producing a write magnetic field for writing the data on the recording medium by means of a perpendicular magnetic recording system;

a shield formed of a magnetic material and having a second end face located in the medium facing surface;

a return path section formed of a magnetic material, connecting the main pole and the shield to each other and allowing a magnetic flux that corresponds to the magnetic field produced by the coil to pass;

a waveguide including a core through which light propagates, and a cladding provided around the core;

a plasmon generator including a near-field light generating part located in the medium facing surface;

a heater configured to generate heat for causing the medium facing surface to protrude in part;

an expansion layer configured to expand under the heat generated by the heater to thereby cause the medium facing surface to protrude in part; and a nonmagnetic portion formed of a nonmagnetic material and surrounding the expansion layer, wherein the second end face is located on a rear side in a direction of travel of the recording medium relative to the first end face, the near-field light generating part is located between the first end face and the second end face, the plasmon generator is configured so that a surface plasmon is excited on the plasmon generator based on the light propagating through the core, and the near-field light generating part generates near-field light based on the surface plasmon, the return path section includes a first yoke portion, a second yoke portion, a first columnar portion, a second columnar portion, and a third columnar portion, the first yoke portion, the second yoke portion and the first columnar portion are located on a front side in the direction of travel of the recording medium relative to the core, the first columnar portion is located away from the medium facing surface and has a first end and a second end opposite to each other in the direction of travel of the recording medium, the second and third columnar portions are located closer to the medium facing surface than is the first columnar portion, the first yoke portion connects the main pole to the first end of the first columnar portion, the second columnar portion and the third columnar portion are located on opposite sides of the plasmon generator in a track width direction and connected to the shield, the second yoke portion is connected to the second end of the first columnar portion, and connected to the shield via the second and third columnar portions, the coil is wound around the first columnar portion, the heater, the expansion layer and the nonmagnetic portion are located on the rear side in the direction of travel of the recording medium relative to the core, and the expansion layer is higher in thermal conductivity and linear thermal expansion coefficient than the nonmagnetic portion.

2. The thermally-assisted magnetic recording head according to claim 1, wherein
the core has an evanescent light generating surface that generates evanescent light based on the light propagating through the core,
the plasmon generator includes a plasmon exciting part located at a predetermined distance from the evanescent light generating surface and facing the evanescent light generating surface, and
in the plasmon generator, the surface plasmon is excited on the plasmon exciting part through coupling with the evanescent light generated by the evanescent light generating surface, the surface plasmon propagates to the near-field light generating part, and the near-field light generating part generates the near-field light based on the surface plasmon.

3. The thermally-assisted magnetic recording head according to claim 1, further comprising a sensor for detecting contact of part of the medium facing surface with the recording medium.

4. The thermally-assisted magnetic recording head according to claim 1, wherein
the core has a front end face facing toward the medium facing surface, and
the front end face is located between the first end face and the second end face in the direction of travel of the recording medium.

5. The thermally-assisted magnetic recording head according to claim 1, wherein
the core has a front end face facing toward the medium facing surface,
the front end face has a first edge and a second edge opposite to each other in the direction of travel of the recording medium,
the first edge is located closer to the near-field light generating part than is the second edge, and
when the front end face is divided into two regions: a first region extending from a midpoint position between the first edge and the second edge to the first edge; and a second region extending from the midpoint position to the second edge, the shield overlaps only the first region of the front end face when viewed in a direction perpendicular to the medium facing surface.

6. The thermally-assisted magnetic recording head according to claim 5, wherein
the shield includes a first non-overlapping portion and a second non-overlapping portion that are located on opposite sides of the front end face of the core in the track width direction when viewed in the direction perpendicular to the medium facing surface,
the second columnar portion is connected to the first non-overlapping portion, and
the third columnar portion is connected to the second non-overlapping portion.

7. The thermally-assisted magnetic recording head according to claim 5, wherein the first end face and the second end face are at a distance of 50 to 300 nm from each other.

* * * * *